US011800196B1

(12) United States Patent
Iguchi et al.

(10) Patent No.: US 11,800,196 B1
(45) Date of Patent: *Oct. 24, 2023

(54) TRANSMISSION METHOD, RECEPTION METHOD, TRANSMISSION APPARATUS, AND RECEPTION APPARATUS

(71) Applicant: Panasonic Intellectual Property Corporation of America, Torrance, CA (US)

(72) Inventors: Noritaka Iguchi, Osaka (JP); Tadamasa Toma, Osaka (JP); Hisaya Katou, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,730

(22) Filed: Nov. 4, 2022

Related U.S. Application Data

(63) Continuation of application No. 17/402,827, filed on Aug. 16, 2021, now Pat. No. 11,523,191, which is a
(Continued)

(30) Foreign Application Priority Data

Oct. 17, 2014 (JP) .................................. 2014-213006

(51) Int. Cl.
*H04N 21/643* (2011.01)
*H04N 21/43* (2011.01)
(Continued)

(52) U.S. Cl.
CPC ..... *H04N 21/64322* (2013.01); *H04L 7/0012* (2013.01); *H04N 21/2381* (2013.01);
(Continued)

(58) Field of Classification Search
CPC ....... H04N 21/64322; H04N 21/23614; H04N 21/2381; H04N 21/242; H04N 21/26283;
(Continued)

(56) References Cited

U.S. PATENT DOCUMENTS 8,806,063 B1 * 8/2014 Kamath .................... G06F 1/14
709/248
9,992,550 B2 6/2018 Iguchi
(Continued)

FOREIGN PATENT DOCUMENTS

EP 3 048 793 7/2016
EP 3048793 7/2016
(Continued)

OTHER PUBLICATIONS

International Search Report of PCT application No. PCT/JP2014/005427 dated Jan. 27, 2015.
(Continued)

*Primary Examiner* — Randy A Flynn
(74) *Attorney, Agent, or Firm* — Wenderoth, Lind & Ponack, L.L.P.

(57) ABSTRACT

A transmission method includes generating one or more frames for content transfer using IP (Internet Protocol) packets, and transmitting the one or more generated frames by broadcast. Each of the one or more frames contains a plurality of second transfer units, each of the plurality of second transfer units contains one or more first transfer units, and each of the one or more first transfer units contains at least one of the IP packets. An object IP packet of the IP packets which is stored in a first transfer unit positioned at a head in the one or more frames contains reference clock information that indicates time for reproduction of the content in data structure different from data structure of an
(Continued)

DATA TYPE = LONG-FORMAT NTP, DATA LENGTH = 64 BITS

| DATA TYPE | DATA LENGTH | REFERENCE CLOCK INFORMATION |
|---|---|---|

MMT (MPEG Media Transport) packet, and header compression processing on the object IP packet is omitted.

8 Claims, 24 Drawing Sheets

Related U.S. Application Data continuation of application No. 16/558,466, filed on Sep. 3, 2019, now Pat. No. 11,128,928, which is a continuation of application No. 15/966,485, filed on Apr. 30, 2018, now Pat. No. 10,440,442, which is a continuation of application No. 15/139,209, filed on Apr. 26, 2016, now Pat. No. 9,992,550, which is a continuation of application No. PCT/JP2014/005427, filed on Oct. 27, 2014.

(60) Provisional application No. 61/901,627, filed on Nov. 8, 2013.

(51) Int. Cl.
*H04L 7/00* (2006.01)
*H04N 21/236* (2011.01)
*H04N 21/2381* (2011.01)
*H04N 21/242* (2011.01)
*H04N 21/262* (2011.01)
*H04N 21/438* (2011.01)
*H04N 21/61* (2011.01)

(52) U.S. Cl.
CPC ..... *H04N 21/23614* (2013.01); *H04N 21/242* (2013.01); *H04N 21/26283* (2013.01); *H04N 21/4305* (2013.01); *H04N 21/4381* (2013.01); *H04N 21/6125* (2013.01)

(58) Field of Classification Search
CPC ........... H04N 21/4305; H04N 21/4381; H04N 21/6125; H04L 7/0012
See application file for complete search history.

(56) References Cited

U.S. PATENT DOCUMENTS

| | | |
|---|---|---|
| 2009/0226147 A1 | 9/2009 | Miura |
| 2010/0199301 A1 | 8/2010 | Hayashi |
| 2012/0096495 A1 | 4/2012 | Matsunaga |
| 2012/0320925 A1 | 12/2012 | Park |
| 2013/0016282 A1 | 1/2013 | Kim |
| 2013/0097627 A1 | 4/2013 | Hwang |
| 2016/0192028 A1 | 6/2016 | Iguchi et al. |
| 2016/0205441 A1 | 7/2016 | Iguchi et al. |
| 2016/0261358 A1 | 9/2016 | Iguchi |

FOREIGN PATENT DOCUMENTS

| | | |
|---|---|---|
| EP | 3 054 608 | 8/2016 |
| EP | 3054608 | 8/2016 |
| JP | 2011-103568 | 5/2011 |
| WO | 2014/188960 | 11/2014 |

OTHER PUBLICATIONS

"Association of Radio Industries and Businesses Digital Hoso System Kaihatsu Bukai", Cho Koseisaido Television Hoso No Tajuka Hoshiki Ni Kansuru Chukan Hokoku, Oct. 15, 2013, pp. 1-15 (Partial Translation).
"Information technology—High efficiency coding and media delivery in heterogeneous environments, Part1: MPEG media transport(MMT)", ISO-IEC FDIS 23008-1, 2013.
Extended European Search Report dated Nov. 10, 2016 in corresponding European patent application No. 14861080.1.
English Translation: "Transmission System for Advanced Wide Band Digital Satellite Broadcasting Association of Radio Industries and Businesses", Jul. 31, 2014 (Jul. 31, 2014), XP055314241, Retrieved from the Internet: URL:http://www.arib.or.jp/english/html/overview/doc/6-STD-B44v2_0-E1.pdf [retrieved on Oct. 27, 2016] p. 83-p. 86.
Extended European Search Report dated Nov. 10, 2016 for the related European Patent Application No. 14861080.1.
English Translation: "Transmission System for Advanced Wide Band Digital Satellite Broadcasting Association of Radio Industries and Businesses", Jul. 31, 2014 (Jul. 31, 2014), XP055314241, Retrieved from the Internet: URL: http://www.arib.or.jp/english/html/overview/doc/6-STD-B44v2_0-E1.pdf [Retrieved on Oct. 27, 2016].

* cited by examiner

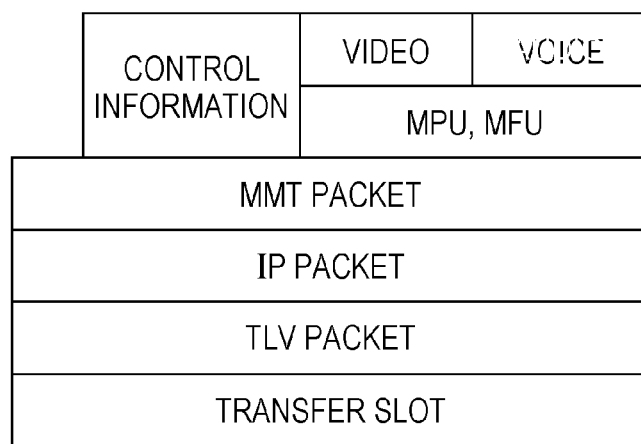

FIG. 9

DATA TYPE = LONG-FORMAT NTP, DATA LENGTH = 64 BITS

| DATA TYPE | DATA LENGTH | REFERENCE CLOCK INFORMATION |
|---|---|---|

FIG. 11

DATA TYPE = IP PACKET WITH REFERENCE CLOCK

| DATA TYPE | DATA LENGTH | REFERENCE CLOCK INFORMATION | IP PACKET |
|---|---|---|---|

FIG. 12

DATA TYPE = IP PACKET

| REFERENCE CLOCK INFORMATION | DATA TYPE | DATA LENGTH | IP PACKET |
|---|---|---|---|

FIG. 16

| CHANGE INSTRUCTION 8 | TRANSFER MODE/ SLOT INFORMATION 192 | STREAM CLASSIFICATION/ RELATIVE STREAM INFORMATION 128 | PACKET FORM/ RELATIVE STREAM INFORMATION 896 | POINTER/ SLOT INFORMATION 3840 | RELATIVE STREAM/ SLOT INFORMATION 480 | RELATIVE STREAM/ TRANSFER STREAM ID CORRESPONDENCE TABLE INFORMATION 256 | TRANSMISSION-RECEPTION CONTROL INFORMATION 8 | EXTENSION INFORMATION 3614 |

FIG. 17

| STREAM CLASSIFICATION OF RELATIVE STREAM 0 8 | STREAM CLASSIFICATION OF RELATIVE STREAM 1 8 | STREAM CLASSIFICATION OF RELATIVE STREAM 2 8 | STREAM CLASSIFICATION OF RELATIVE STREAM 3 8 | ... | STREAM CLASSIFICATION OF RELATIVE STREAM 12 8 | STREAM CLASSIFICATION OF RELATIVE STREAM 13 8 | STREAM CLASSIFICATION OF RELATIVE STREAM 14 8 | STREAM CLASSIFICATION OF RELATIVE STREAM 15 8 |
|---|---|---|---|---|---|---|---|---|

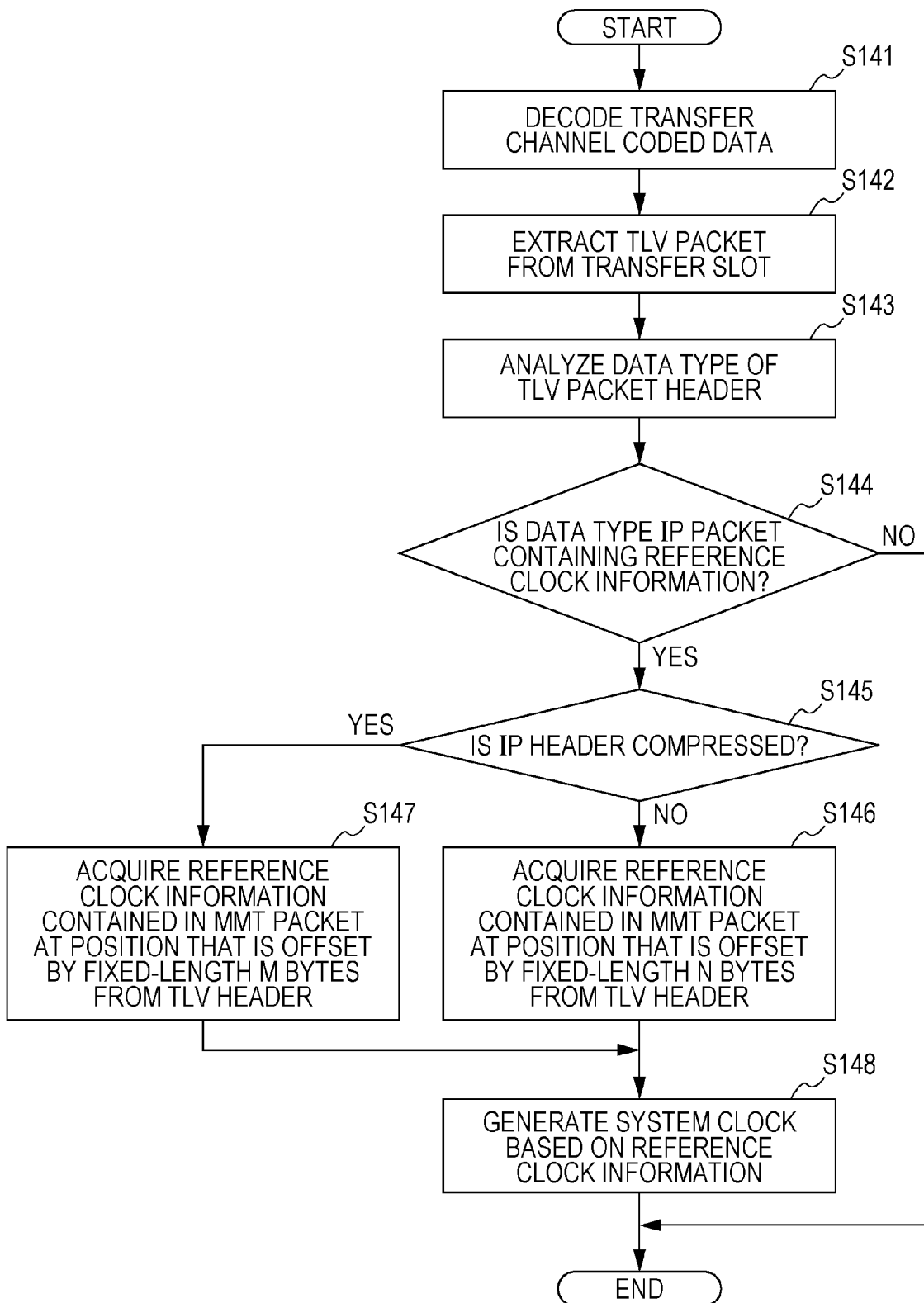

FIG. 22A

| EXTENSION IDENTIFICATION 16 | EXTENSION AREA 3598 |

FIG. 22B

| NUMBER OF PAGES 16 | PAGE NUMBER 16 | ADDITIONAL INFORMATION CLASSIFICATION 8 | OBJECT SERVICE SPECIFICATION METHOD 8 | ADDITIONAL INFORMATION PAYLOAD 3550 |

FIG. 24A

```
EXTENSION AREA(){
  EXTENSION CLASSIFICATION: TYPE A DATA LENGTH NA
  EXTENSION CLASSIFICATION: TYPE B DATA LENGTH NB
  EXTENSION CLASSIFICATION: TYPE C DATA LENGTH NC for(i=0; i<NA; i++){
    EXTENSION CLASSIFICATION: TYPE A DATA
  }
  for(i=0; i<NB; i++){
    EXTENSION CLASSIFICATION: TYPE B DATA
  }
  for(i=0; i<NC; i++){
    EXTENSION CLASSIFICATION: TYPE C DATA
  }
}
```

FIG. 24B

```
EXTENSION AREA(){
  EXTENSION AREA NUMBER
  for(i=0; i<EXTENSION AREA NUMBER; i++){
    EXTENSION CLASSIFICATION
    EXTENSION AREA LENGTH
  }
  for(i=0; i<EXTENSION AREA NUMBER; i++){
    EXTENSION DATA
  }
}
```

TRANSMISSION METHOD, RECEPTION METHOD, TRANSMISSION APPARATUS, AND RECEPTION APPARATUS

BACKGROUND

1. Technical Field

The present disclosure relates to a transmission method and the like for transmitting the content by using IP (Internet Protocol) packets through broadcast.

2. Description of the Related Art

A MMT (MPEG Media Transport) scheme (refer to NPTL 1) is a multiplexing scheme for multiplexing and packetizing content such as video and audio and for transmitting the content through one or more transfer channels such as broadcast and broadband. When the MMT scheme is applied to broadcasting systems, reference clock information of a transmission apparatus is transmitted to a reception apparatus, and the reception apparatus generates a system clock in the reception apparatus based on the reference clock information.

CITATION LIST

Non-Patent Literature

NPTL 1: Information technology-High efficiency coding and media delivery in heterogeneous environments-Part 1: MPEG media transport (MMT), ISO/IEC FDIS 23008-1

SUMMARY

In one general aspect, the techniques disclosed here feature a transmission method including: generating one or more frames for content transfer using IP (Internet Protocol) packets; and transmitting the one or more generated frames by broadcast, wherein each of the one or more frames contains a plurality of second transfer units, each of the plurality of second transfer units contains one or more first transfer units, each of the one or more first transfer units contains at least one of the IP packets, an object IP packet of the IP packets contains reference clock information that indicates time for reproduction of the content in data structure different from data structure of an MMT (MPEG Media Transport) packet, the object IP packet being stored in a first transfer unit positioned at a head in the one or more frames, and header compression processing on the object IP packet is omitted.

The transmission method and the like according to one aspect of the present disclosure can reduce processes for acquiring the reference clock information by a reception apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 1 is a diagram illustrating a protocol stack for performing transfer using an MMT scheme and an advanced BS (Broadcast Satellite) transfer scheme.

FIG. 2 is a diagram illustrating data structure of a TLV packet;

FIG. 9 is a diagram illustrating an example in which a long-format NTP is stored in the TLV packet;

FIG. 11 is a diagram illustrating structure in which the reference clock information is appended immediately before an IP packet header;

FIG. 12 is a diagram illustrating structure in which the reference clock information is appended immediately before the TLV packet;

FIG. 16 is a diagram illustrating structure of TMCC control information under a transfer scheme for advanced broadband satellite digital broadcast;

FIG. 17 is a diagram illustrating stream classification/relative stream information of the TMCC control information;

FIG. 21 is a diagram illustrating a flow of extracting a bit string at a specific position from the IP packet or compressed IP packet;

FIG. 22A is a diagram illustrating an example of structure of TMCC extension information;

FIG. 22B is a diagram illustrating an example of a conventionally proposed bit assignment method when the extension area is used as a payload;

FIG. 24A is a diagram illustrating an example of syntax when the extension classification is used;

FIG. 24B is a diagram illustrating another example of syntax when the extension classification is used;

Figure 3:
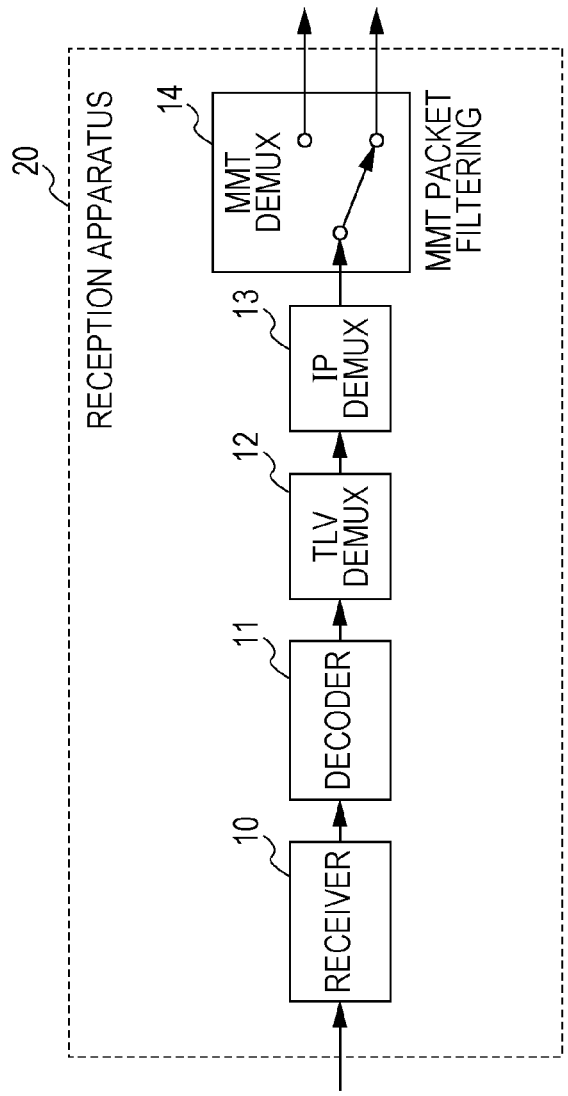
FIG. 3 is a block diagram illustrating a basic configuration of a reception apparatus.

DETAILED DESCRIPTION (Underlying Knowledge Forming Basis of the Present Disclosure)

The present disclosure relates to a method and apparatus in which a reception apparatus receives reference clock information transmitted from a transmission apparatus and generates (reproduces) a reference clock in a hybrid delivery system using an MMT (MPEG Media Transport) scheme which is under standardization by MPEG (Moving Picture Expert Group).

The MMT scheme is a multiplexing scheme for multiplexing and packetizing video and audio to transmit the video and audio via one or more transfer channels such as broadcast and broadband.

When the MMT scheme is applied to a broadcasting system, the reference clock of the transmission apparatus is synchronized with an NTP (Network Time Protocol) prescribed by IETF RFC (Internet Engineering Task Force Request for Comments) 5905, and based on the reference clock, a time stamp such as PTS (Presentation Time Stamp) and DTS (Decode Time Stamp) is added to a medium. Furthermore, the transmission apparatus transmits the reference clock information to the reception apparatus, and the reception apparatus generates the reference clock (hereinafter also referred to as a system clock) in the reception apparatus based on the reference clock information.

In the broadcasting system, a 64-bit long-format NTP capable of indicating absolute time is preferably used as the reference clock information. However, although the conventional MMT scheme prescribes storing a 32-bit short-format NTP in an MMT packet header and transferring the 32-bit short-format NTP, the conventional MMT scheme does not prescribe transferring the long-format NTP, and it is difficult for a receiver apparatus to acquire high-precision reference clock information.

In contrast, control information, such as a message, a table, and a descriptor, is defined using the long-format NTP. It is possible to append the MMT packet header to the control information for transfer. An MMT packet, which is the control information to which the MMT packet header is appended, is stored in an IP packet, and is transferred through a broadcast transfer channel or a broadband channel.

When the MMT packet is transferred using an advanced BS transfer scheme prescribed by the ARIB standard (STD-B44: transfer scheme for advanced broadband satellite digital broadcast), after encapsulation of the MMT packet into the IP packet and encapsulation of the IP packet into a TLV (Type Length Value) packet, the MMT packet is stored in a transfer slot prescribed by the advanced BS transfer scheme.

However, when the transmission apparatus stores the reference clock information in an MMT packet layer, in order to obtain the reference clock information, the reception apparatus extracts the TLV packet from the transfer slot, extracts the IP packet from the TLV packet, extracts the MMT packet from the IP packet, and further extracts the reference clock information from the header or a payload of the MMT packet. Therefore, the reception apparatus involves many processes for acquiring the reference clock information, and needs longer time until the acquisition.

Also, processes in layers equal to or higher than an IP layer are software processes. Accordingly, when the reference clock information is stored in the MMT packet, the reference clock information is extracted and reproduced by a software program. Therefore, the reference clock information to be acquired may contain jitter, depending on throughput of a CPU, interruption by and priority of other software programs, and the like.

Therefore, a transmission method according to one aspect of the present disclosure includes: generating one or more frames for content transfer using IP (Internet Protocol) packets; and transmitting the one or more generated frames by broadcast, wherein each of the one or more frames contains a plurality of second transfer units, each of the plurality of second transfer units contains one or more first transfer units, each of the one or more first transfer units contains at least one of the IP packets, an object IP packet of the IP packets contains reference clock information that indicates time for reproduction of the content in data structure different from data structure of an MMT (MPEG Media Transport) packet, the object IP packet being stored in a first transfer unit positioned at a head in the one or more frames, and header compression processing on the object IP packet is omitted.

Thus, by containing the reference clock information in the TLV packet positioned at a head within the transfer slot, the reception apparatus can specify a position of the reference clock information in advance. Therefore, the reception apparatus can reduce (simplify) processes for acquiring the reference clock information. Here, an example of the first transfer unit is a TLV packet, an example of the second transfer unit is a slot, and an example of the transfer frame is a transfer slot.

In addition, by the transmission apparatus prescribing presence of header compression of the IP packet, the reception apparatus can specify the position of the reference clock information in more detail. Such structure can also simplify the process by which the reception apparatus acquires the reference clock information.

In addition, the content may be stored in the MMT packet within each of the IP packets.

In addition, each of the first transfer units may be a variable-length transfer unit, and each of the second transfer units may be a fixed-length transfer unit.

In addition, each of the first transfer units may be a TLV (Type Length Value) packet, each of the second transfer units may be a slot under the transfer scheme for advanced broadband satellite digital broadcast, and each of the frames may be a transfer slot under the transfer scheme for advanced broadband satellite digital broadcast.

In addition, the reference clock information may be an NTP (Network Time Protocol).

In addition, the frames may be transmitted in a predetermined transmission cycle.

A reception method according to one aspect of the present disclosure includes: receiving by broadcast one or more frames for content transfer using IP (Internet Protocol) packets, the one or more frames containing reference clock information; extracting the reference clock information from the received frames; and generating a clock for reproducing the content by using the extracted reference clock information, wherein each of the one or more frames contains a plurality of second transfer units, each of the plurality of second transfer units contains one or more first transfer units, each of the one or more first transfer units contains at least one of the IP packets, an object IP packet of the IP packets contains the reference clock information that indicates time for reproduction of the content in data structure different from data structure of an MMT (MPEG Media Transport) packet, the object IP packet being stored in a first transfer unit positioned at a head in the one or more frames, and header compression processing on the object IP packet is omitted.

A transmission apparatus according to one aspect of the present disclosure includes: a generator that generates one or more frames for content transfer using IP (Internet Protocol) packets; and a transmitter that transmits the one or more generated frames by broadcast, wherein each of the one or more frames contains a plurality of second transfer units, each of the plurality of second transfer units contains one or more first transfer units, each of the one or more first transfer units contains at least one of the IP packets, an object IP packet of the IP packets contains reference clock information that indicates time for reproduction of the content in data structure different from data structure of an MMT (MPEG Media Transport) packet, the object IP packet being stored in a first transfer unit positioned at a head in the one or more frames, and header compression processing on the object IP packet is omitted.

A reception apparatus according to one aspect of the present disclosure includes: a receiver that receives by broadcast one or more frames for content transfer using IP (Internet Protocol) packets, the one or more frames containing reference clock information; an extractor that extracts the reference clock information from the received frames; and a generator that generates a clock for reproducing the content by using the extracted reference clock information, wherein each of the one or more frames contains a plurality of second transfer units, each of the plurality of second transfer units contains one or more first transfer units, each of the one or more first transfer units contains at least one of the IP packets, an object IP packet of the IP packets contains the reference clock information that indicates time for reproduction of the content in data structure different from data structure of an MMT (MPEG Media Transport) packet, the object IP packet being stored in a first transfer unit positioned at a head in the one or more frames, and header compression processing on the object IP packet is omitted.

Note that these comprehensive or specific aspects may be implemented using a system, an apparatus, a method, an integrated circuit, a computer program, or a computer-readable recording medium such as a CD-ROM. Also, these comprehensive or specific aspects may be implemented using any combination of a system, an apparatus, a method, an integrated circuit, a computer program, and a recording medium.

Exemplary embodiments will be specifically described below with reference to the drawings.

Note that each of the exemplary embodiments below describes a comprehensive or specific example. Numerical values, shapes, materials, elements, arranged positions and connection forms of the elements, steps, the order of the steps, and the like described in the following exemplary embodiments are merely an example, and do not intend to limit the present disclosure. Also, among elements described in the following exemplary embodiments, elements that are not included in an independent claim which represents the highest concept are described as optional elements.

First Exemplary Embodiment

[Basic Configuration of an MMT Scheme]

First, a basic configuration of an MMT scheme will be described. FIG. 1 illustrates a protocol stack diagram for performing transfer using the MMT scheme and an advanced BS transfer scheme.

Under the MMT scheme, information such as video and audio is stored in a plurality of MPUs (Media Presentation Units) and a plurality of MFUs (Media Fragment Units), and an MMT packet header is added for MMT-packetization.

Meanwhile, under the MMT scheme, the MMT packet header is added to control information such as an MMT message for MMT-packetization. The MMT packet header is provided with a field that stores a 32-bit short-format NTP, and this field may be used for QoS control of communication networks, etc.

MMT-packetized data is encapsulated into an IP packet having a UDP header or IP header. At this time, in the IP header or UDP header, when a set of packets with an identical source IP address, destination IP address, source port number, destination port number, and protocol classification is an IP data flow, headers of the plurality of IP packets contained in one IP data flow are redundant. Therefore, header compression of some IP packets is performed in one IP data flow.

Next, a TLV packet will be described in detail. FIG. 2 is a diagram illustrating data structure of the TLV packet.

As illustrated in FIG. 2, an IPv4 packet, IPv6 packet, compressed IP packet, NULL packet, and transfer control signal are stored in the TLV packet. These pieces of information are identified using an 8-bit data type. Examples of the transfer control signal include an AMT (Address Map Table) and NIT (Network Information Table). Also, in the TLV packet, a data length (byte unit) is indicated using a 16-bit field, and a value of data is stored after the data length. Since there is 1-byte header information before the data type (not illustrated in FIG. 2), the TLV packet has a total of 4-byte header area.

The TLV packet is mapped to a transfer slot under the advanced BS transfer scheme. Pointer/slot information that indicates a head position of a first packet and a tail position of a last packet which are contained in every slot are stored in TMCC (Transmission and Multiplexing Configuration Control) control information (control signal).

Next, a configuration of a reception apparatus when the MMT packet is transferred by using the advanced BS transfer scheme will be described. FIG. 3 is a block diagram illustrating the basic configuration of the reception apparatus. Note that the configuration of the reception apparatus of FIG. 3 is simplified. More specific configuration will be described later individually according to a manner in which reference clock information is stored.

Reception apparatus 20 includes receiver 10, decoder 11, TLV demultiplexer (DEMUX) 12, IP demultiplexer (DEMUX) 13, and MMT demultiplexer (DEMUX) 14.

Receiver 10 receives transfer channel coded data.

Decoder 11 decodes the transfer channel coded data received by receiver 10, applies error correction and the like, and extracts the TMCC control information and TLV data. The TLV data extracted by decoder 11 undergoes DEMUX processing by TLV demultiplexer 12.

The DEMUX process performed by TLV demultiplexer 12 differs according to the data type. For example, when the data type is a compressed IP packet, TLV demultiplexer 12 performs processes such as decompressing the compressed header and passing the header to an IP layer.

IP demultiplexer 13 performs processes such as header analysis of the IP packet or UDP packet, and extracts the MMT packet from each IP data flow.

MMT demultiplexer 14 performs a filtering process (MMT packet filtering) based on a packet ID stored in the MMT packet header.

[Method for Storing the Reference Clock Information in the MMT Packet]

Under the MMT scheme described with reference to FIG. 1 to FIG. 3 described above, although the 32-bit short-format NTP can be stored in the MMT packet header and transferred, there exists no method for transferring a long-format NTP.

Hereinafter, a method for storing the reference clock information in the MMT packet will be described. First, the method for storing the reference clock information within the MMT packet will be described.

When control information that defines a descriptor, a table, or a message for storing the reference clock information is stored in the MMT packet, the descriptor indicating the reference clock information and an identifier indicating the table or message are indicated within the control information. Then, the control information is stored in the MMT packet by a transmission apparatus.

This allows reception apparatus 20 to identify the reference clock information based on the identifier. Note that the reference clock information may be stored in the MMT packet by using existing descriptors (for example, CRI_descriptor( ), etc.).

Next, a method for storing the reference clock information in the MMT packet header will be described.

For example, there is a method for storing the reference clock information by using a header_extension field (hereinafter referred to as an extension field). The extension field becomes effective when an extension_flag of the MMT packet header is set to '1'.

An extension field type indicating data classification of data to be stored in the extension field is stored in the extension field. Information indicating that the data is reference clock information (for example, a 64-bit long-format NTP) is stored in the extension field type. Accordingly, the reference clock information is stored in the extension field.

When the header_extension_flag of the MMT packet header is '1', reception apparatus 20 refers to the extension field of the MMT packet. When the extension field type indicates that the data is the reference clock information, reception apparatus 20 extracts the reference clock information and reproduces a clock.

Note that the reference clock information may be stored in an existing header field. In addition, when there is an unused field or when there is a field unnecessary for broadcast, the reference clock information may be stored in these fields.

In addition, the reference clock information may be stored by using the existing field and the extension field together. For example, the existing 32-bit short-format NTP field and the extension field may be used together.

In order to maintain compatibility with the existing field, of the 64-bit long-format NTP, a 32-bit section of the reference clock information corresponding to a short-format format may be stored in the existing field, and remaining 32 bits may be stored in the extension field.

Here, the reference clock information is, for example, time when a head bit of the MMT packet in which the reference clock information is stored passes a predetermined position (for example, when the head bit is output from a specific component of a transmission apparatus). However, the reference clock information may be time when a bit of another position passes the predetermined position.

When the reference clock information is stored in the MMT packet as the control information, the MMT packet containing the control information is transmitted at predetermined transmission intervals.

When the reference clock information is stored in the extension field of the MMT packet, the reference clock information is stored in the extension field of a predetermined MMT packet header. Specifically, for example, at least one or more pieces of the reference clock information are stored in the header extension fields of the MMT packets at intervals of 100 ms.

Note that, when the reference clock information is stored in the MMT packet, the packet ID of the MMT packet that stores the reference clock information is stored in program information. Reception apparatus 20 analyzes the program information and acquires the MMT packet in which the reference clock information is stored. At this time, the packet ID of the MMT packet in which the reference clock information is stored may be prescribed in advance as a fixed value. This allows reception apparatus 20 to acquire the reference clock information without analyzing the program information.

[Operation Flow when the Reference Clock Information is Stored in the MMT Packet]

Next, an operation flow when the reference clock information is stored in the MMT packet (acquisition flow of the reference clock information) will be described.

Figure 4:
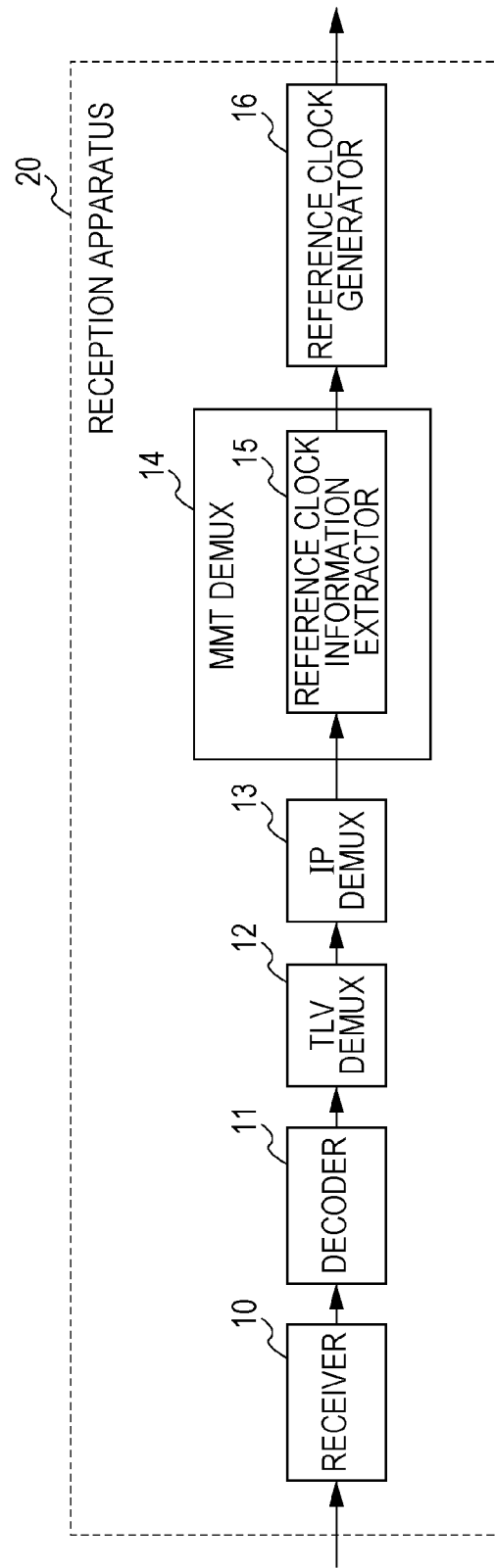
FIG. 4 is a block diagram illustrating a functional configuration of the reception apparatus when reference clock information is stored in an extension field of an MMT packet header.
Figure 5:
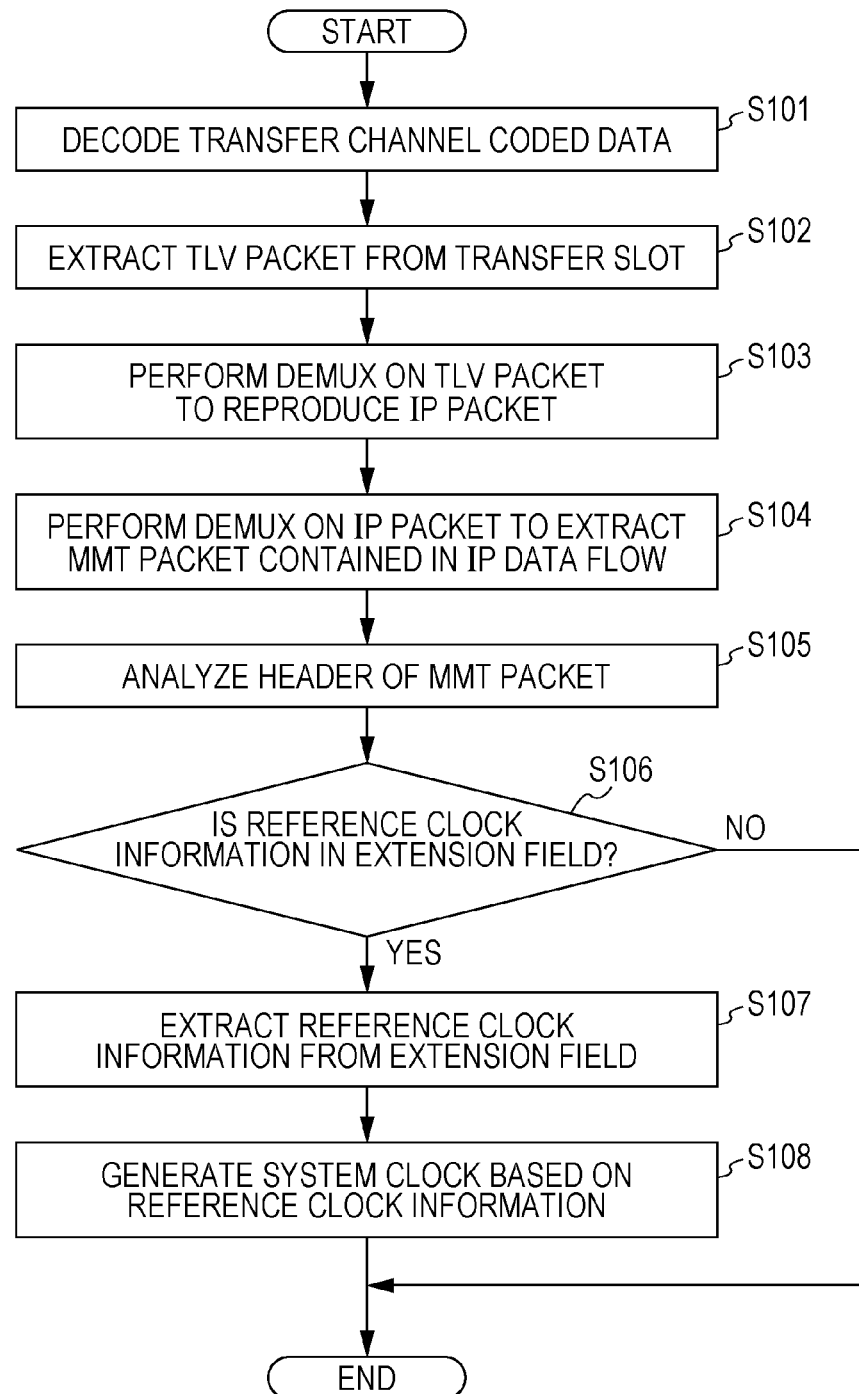
FIG. 5 is a diagram illustrating an acquisition flow of the reference clock information performed by the reception apparatus when the reference clock information is stored in the extension field of the MMT packet header.

First, the following describes the acquisition flow of the reference clock information performed by reception apparatus 20 when the reference clock information is stored in the extension field of the MMT packet header. FIG. 4 is a block diagram illustrating a functional configuration of reception apparatus 20 when the reference clock information is stored in the extension field of the MMT packet header. FIG. 5 is a diagram illustrating the acquisition flow of the reference clock information performed by reception apparatus 20 when the reference clock information is stored in the extension field of the MMT packet header.

In FIG. 4, when the reference clock information is stored in the extension field of the MMT packet header, MMT demultiplexer 14 includes reference clock information extractor 15 (an example of an extractor), and reference clock generator 16 (an example of a generator) is provided downstream of MMT demultiplexer 14.

In the flow of FIG. 5, decoder 11 of reception apparatus 20 decodes the transfer channel coded data received by receiver 10 (S101), and extracts the TLV packet from the transfer slot (S102).

Next, TLV demultiplexer 12 performs DEMUX on the extracted TLV packet to extract the IP packet (S103). At this time, the header of the compressed IP packet is reproduced.

Next, IP demultiplexer 13 performs DEMUX on the IP packet, acquires the specified IP data flow, and extracts the MMT packet (S104).

Next, MMT demultiplexer 14 analyzes the header of the MMT packet, and determines whether the extension field is used and whether the reference clock information is in the extension field (S106). When there is no reference clock information in the extension field (No in S106), the process ends.

On the other hand, when the determination is made that the reference clock information is in the extension field (Yes in S106), reference clock information extractor extracts the reference clock information from the extension field (S107). Then, reference clock generator 16 generates the system clock based on the extracted reference clock information (S108). The system clock is, in other words, a clock for reproducing content.

Figure 6:
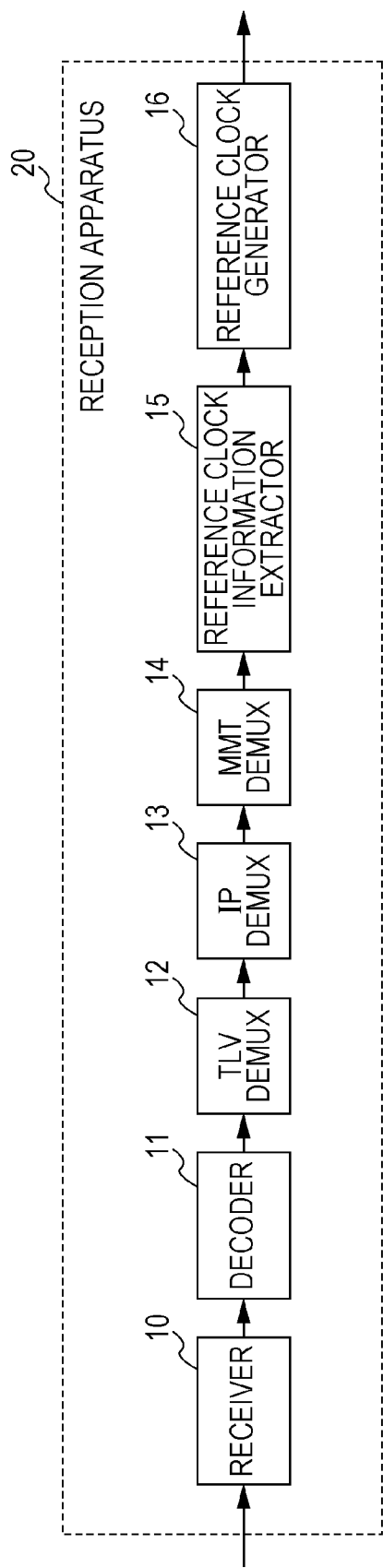
FIG. 6 is a block diagram illustrating the functional configuration of the reception apparatus when the reference clock information is stored in control information.
Figure 7:
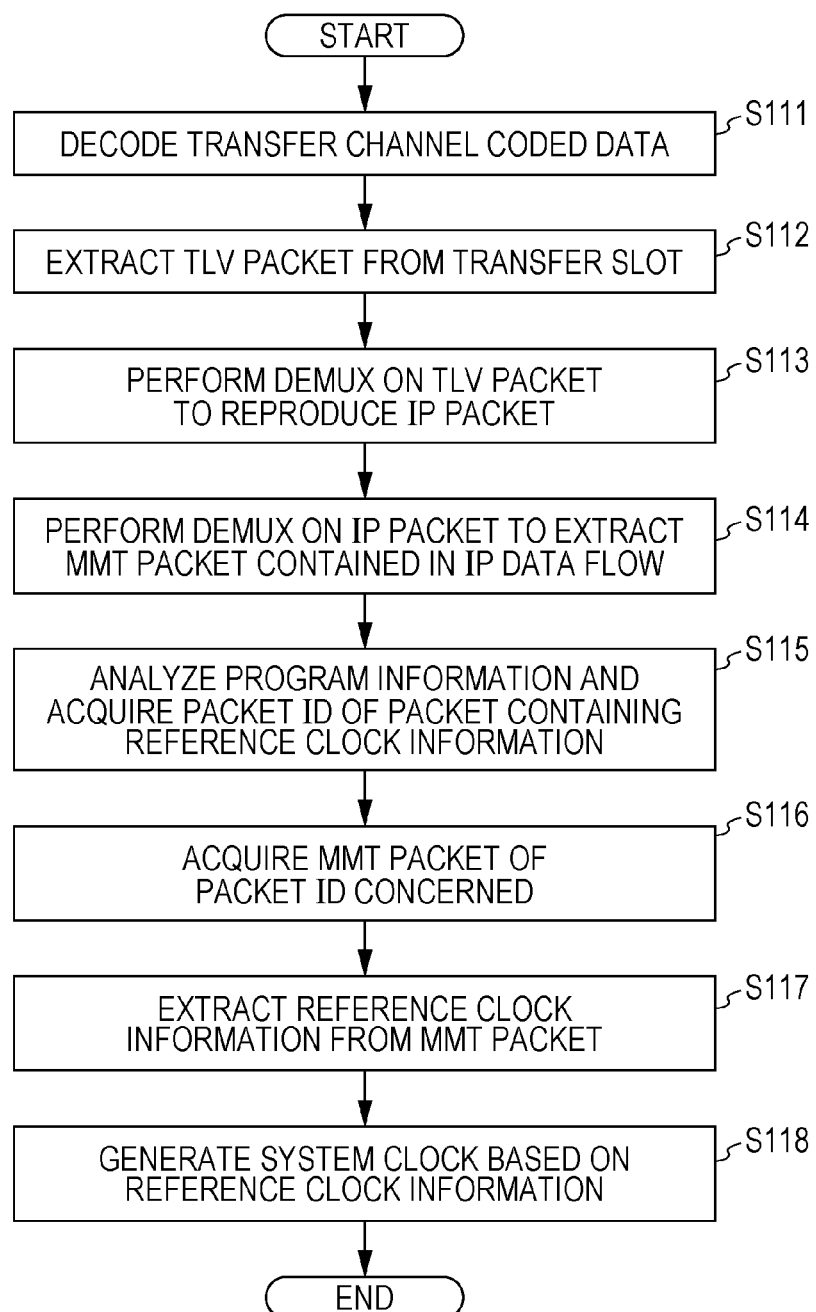
FIG. 7 is a diagram illustrating the acquisition flow of the reference clock information performed by the reception apparatus when the reference clock information is stored in the control information.

Next, the acquisition flow of the reference clock information by reception apparatus 20 when the reference clock information is stored in the control information will be described. FIG. 6 is a block diagram illustrating the functional configuration of reception apparatus 20 when the reference clock information is stored in the control information. FIG. 7 is a diagram illustrating the acquisition flow of the reference clock information performed by reception apparatus 20 when the reference clock information is stored in the control information.

As illustrated in FIG. 6, when the reference clock information is stored in the control information, reference clock information extractor 15 is disposed downstream of MMT demultiplexer 14.

In the flow of FIG. 7, the processes of step S111 to step S114 are identical to the flow of step S101 to step S104 described in FIG. 5.

Subsequently to step S114, MMT demultiplexer 14 acquires the packet ID of the packet containing the reference clock information from the program information (S115), and acquires the MMT packet of the packet ID (S116). Subsequently, reference clock information extractor 15 extracts the reference clock information from the control signal contained in the extracted MMT packet (S117), and reference clock generator 16 generates the system clock based on the extracted reference clock information (S118).

[Method for Storing the Reference Clock Information in the TLV Packet]

As described in FIG. 5 and FIG. 7, when the reference clock information is stored in the MMT packet, in order to obtain the reference clock information by the reception apparatus, reception apparatus 20 extracts the TLV packet from the transfer slot, and extracts the IP packet from the TLV packet.

Furthermore, reception apparatus 20 extracts the MMT packet from the IP packet, and further extracts the reference clock information from the header or a payload of the MMT packet. Thus, when the reference clock information is stored in the MMT packet, reception apparatus 20 has many processes for acquiring the reference clock information, and longer time is required until the acquisition, which need to be addressed.

Therefore, a method will be described for implementing a process of adding a time stamp to a medium, such as video and audio, based on the reference clock, and a process of transferring the medium by using the MMT scheme, and for performing transfer of the reference clock information by using a lower layer, lower protocol, or lower multiplexing scheme than the MMT layer.

Figure 8:
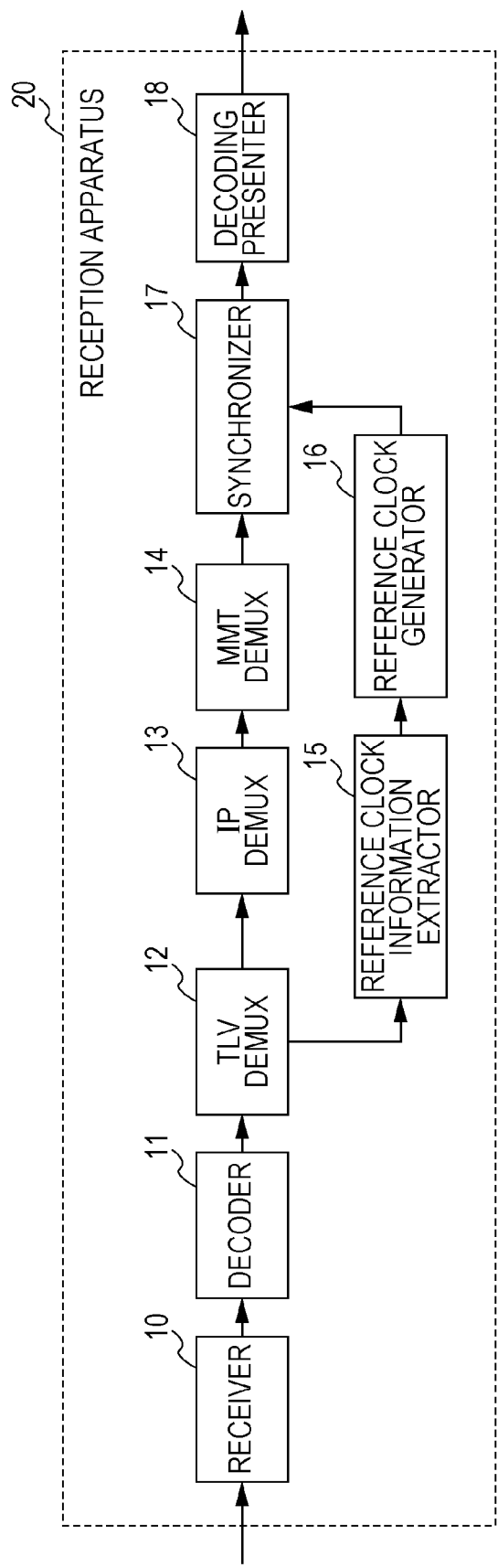
FIG. 8 is a block diagram illustrating the configuration of the reception apparatus when the reference clock information is stored in the TLV packet.

First, a method for storing the reference clock information in the TLV packet for transfer will be described. FIG. 8 is a block diagram illustrating the configuration of reception apparatus 20 when the reference clock information is stored in the TLV packet.

Reception apparatus 20 illustrated in FIG. 8 differs from reception apparatus 20 of FIG. 4 and FIG. 6 in placement of reference clock information extractor 15 and reference clock generator 16. In addition, synchronizer 17 and decoding presenter 18 are also illustrated in FIG. 8.

The TLV packet includes the 8-bit data type, 16-bit data length, and 8*N-bit data, as illustrated in aforementioned FIG. 2. In addition, 1-byte header which is not illustrated in FIG. 2 exists before the data type, as described above. Here, the data type is specifically prescribed, for example, as 0x01: IPv4 packet, 0x03: header-compressed IP packet, etc.

In order to store new data in the TLV packet, an undefined area of the data type is used to prescribe the data type. In order to indicate that the reference clock information is stored in the TLV packet, the data type describes that the data is the reference clock information.

Note that the data type may be prescribed for each kind of the reference clock information. For example, the data types that indicate the short-format NTP, long-format NTP, and PCR (Program Clock Reference) may be prescribed individually. FIG. 9 is a diagram illustrating an example in which the long-format NTP is stored in the TLV packet. The long-format NTP is stored in a data field.

Reference clock information extractor 15 analyzes the data type of TLV packet. When the reference clock information is stored, reference clock information extractor 15 analyzes the data length, and extracts the reference clock information from the data field.

Here, when the data length is uniquely determined by the data type, reference clock information extractor 15 may acquire the reference clock information without analyzing a data length field. For example, when the data type indicates a 64-bit long-format NTP, reference clock information extractor 15 may extract a section from (4 bytes+1 bit)-th bit to (4 bytes+64 bits)-th bit. Also, reference clock information extractor 15 may extract a desired bit from 64-bit data.

Figure 10:
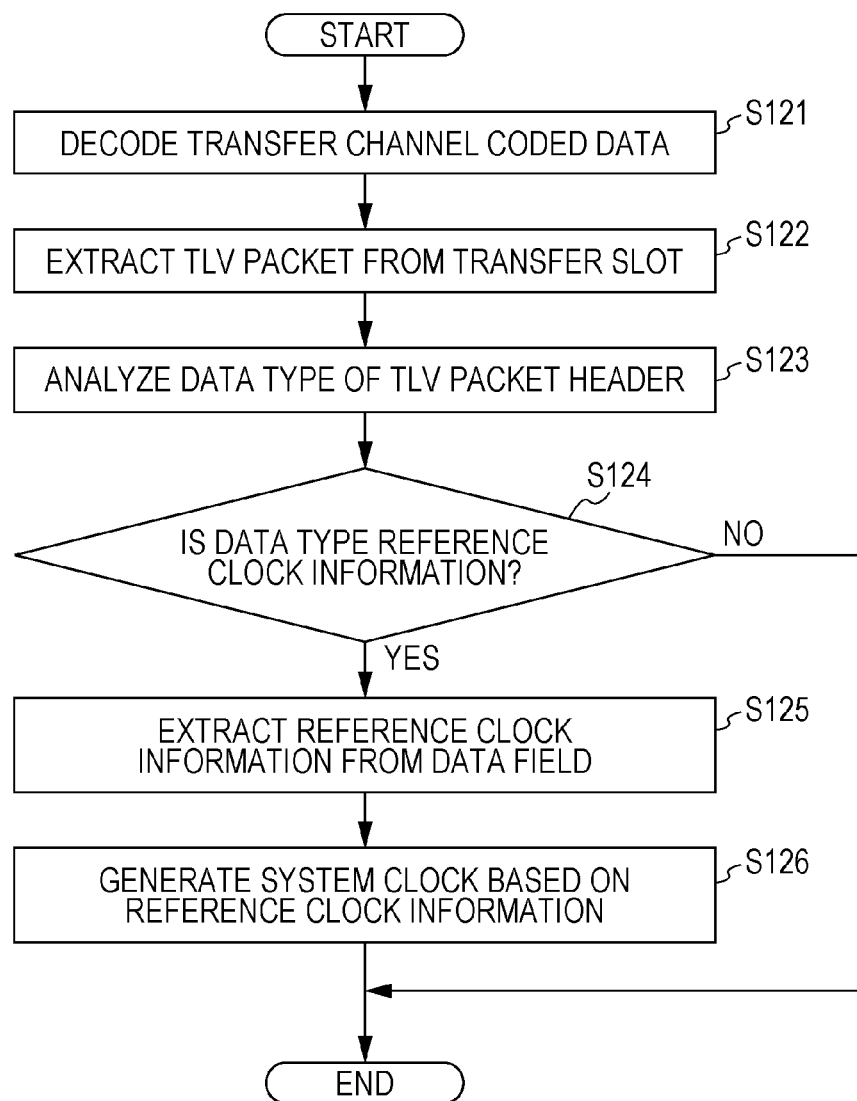
FIG. 10 is a diagram illustrating the acquisition flow of the reference clock information performed by the reception apparatus when the reference clock information is stored in the TLV packet.

Next, the operation flow of reception apparatus 20 when the reference clock information is stored in the TLV packet (acquisition flow of the reference clock information) will be described with reference to FIG. 10. FIG. 10 is a diagram illustrating the acquisition flow of the reference clock information performed by reception apparatus 20 when the reference clock information is stored in the TLV packet.

In the flow of FIG. 10, first, decoder 11 decodes the transfer channel coded data received by receiver 10 (S121), and extracts the TLV packet from the transfer slot (S122).

Next, TLV demultiplexer 12 analyzes the data type of TLV packet (S123), and determines whether the data type is the reference clock information (S124). When the data type is the reference clock information (Yes in S124), reference clock information extractor 15 extracts the reference clock information from the data field of the TLV packet (S125). Then, reference clock generator 16 generates the system clock based on the reference clock information (S126). On the other hand, when the data type is not the reference clock information, (No in S124), the acquisition flow of the reference clock information ends.

In addition, in an unillustrated flow, IP demultiplexer 13 extracts the IP packet according to the data type. Then, the IP DEMUX process and MMT DEMUX process are performed on the extracted IP packet, and the MMT packet is extracted. Furthermore, synchronizer 17 outputs video data to decoding presenter 18 with timing with which the time stamp of the video data contained in the extracted MMT packet coincides with the reference clock generated in step S126. Decoding presenter 18 decodes and presents the video data.

In a transmission method described above, a storage place of the reference clock information is indicated in the data type of the TLV packet, and the reference clock information is stored in the data field of the TLV packet. Thus, by the transmission apparatus storing and transmitting the reference clock information by using a lower layer or lower protocol than the MMT layer, reception apparatus 20 can reduce the processes and time until reception apparatus 20 extracts the reference clock information.

Also, since reception apparatus 20 can extract and reproduce the reference clock information in a lower layer extending over the IP layers, reception apparatus 20 can extract the reference clock information by hardware implementation. This allows reception apparatus 20 to reduce more influence of jitter or the like than extracting the reference clock information by software implementation, and to generate higher-precision reference clock.

Next, other methods for storing the reference clock information will be described.

When the data length is uniquely determined according to the data type in the aforementioned flow of FIG. 10, the data length field does not need to be transmitted. Here, when the data length field is not transmitted, an identifier is stored indicating that the data length field is data that is not transmitted.

Although the reference clock information is stored in the data field of the TLV packet according to the description of FIG. 10, the reference clock information may be appended immediately before or after the TLV packet. Also, the reference clock information may be appended immediately before or after data to be stored in the TLV packet. In these cases, a data type that allows specification of a position where the reference clock information is appended is added.

For example, FIG. 11 is a diagram illustrating structure in which the reference clock information is appended immediately before the IP packet header. In this case, the data type indicates an IP packet with reference clock information. When the data type indicates an IP packet with reference clock information, reception apparatus 20 (reference clock information extractor 15) can acquire the reference clock information by extracting bits of a previously prescribed predetermined length of the reference clock information from a head of the data field of the TLV packet.

At this time, the data length may specify the length of data that includes the length of the reference clock information, and may specify the length that does not include the length of the reference clock information. When the data length specifies the length of data that includes the length of the reference clock information, reception apparatus 20 (reference clock information extractor 15) acquires data of a length obtained by subtracting the length of the reference clock information from the data length from immediately after the reference clock information.

When the data length specifies the length of data that does not include the length of the reference clock information, reception apparatus 20 (reference clock information extractor 15) acquires data of the length specified by the data length from immediately after the reference clock information.

Figure 13:
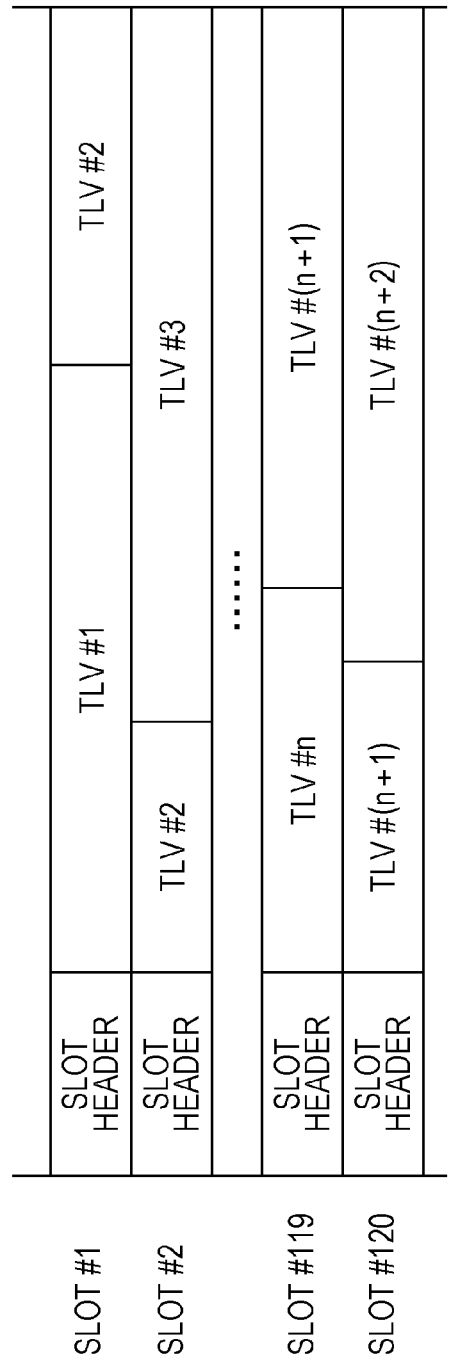
FIG. 13 is a diagram illustrating structure of a transfer slot.

In addition, FIG. 12 is a diagram illustrating structure in which the reference clock information is appended immediately before the TLV packet. The data type is a conventional data type. An identifier indicating that the TLV packet is a TLV packet with reference clock information is stored, for example, in a slot header of the transfer slot or the TMCC control information. FIG. 13 is a diagram illustrating structure of the transfer slot, and FIG. 14 is a diagram illustrating structure of the slot header of the transfer slot.

In FIG. 13, the transfer slot includes a plurality of slots (120 slots of Slot #1 to Slot #120 in the example of FIG. 13). The number of bits contained in each slot is a fixed bit number uniquely determined based on a coding rate of error correction, each of the slots has a slot header and stores one or more TLV packets. Note that, in FIG. 13, the TLV packet is variable-length.

Figure 14:
FIG. 14 is a diagram illustrating structure of a slot header of the transfer slot.

In FIG. 14, a position of a head byte of a first TLV packet within the slot indicated with the number of bytes from a slot head except the slot header is stored in a head TLV instruction field (16 bits) of the slot header. Remaining 160 bits of the slot header is undefined.

The transfer slot includes 120 slots per frame as described above, and a modulation scheme is assigned to the slots in 5-slot unit. In addition, up to 16 streams can be transferred within one frame.

Note that the plurality of streams included in one transfer slot differ from one another, for example, in content (or a company that provides the content) transferred by the streams. In addition, each stream includes one or more slots, and one slot does not extend over the plurality of streams.

When the identifier indicating that the TLV packet is a TLV packet with reference clock information is stored in the slot header, for example, information that allows specification of a position of the TLV packet with reference clock information, kind of the reference clock information, data length, and the like are stored in a slot obtained by extending (using) an undefined field of the slot header.

Note that all pieces of information including the information that allows specification of the position of the TLV packet with reference clock information, kind of the reference clock information, and data length do not need to be stored in the slot header. The slot only needs to indicate information that allows specification of and reference to the TLV packet with reference clock information.

Figure 15:
FIG. 15 is a diagram illustrating an example in which a flag is stored in an undefined area of the slot header.

For example, when definition is made that the reference clock information is a 64-bit long-format NTP, that only one TLV packet with reference clock information can be stored in one slot, and that the one TLV packet with reference clock information is always a head TLV packet, a flag may be stored in the undefined area of the slot header. FIG. 15 is a diagram illustrating an example in which the flag is stored in the undefined area of the slot header.

In FIG. 15, the flag (described as "F" in the diagram) indicating whether the reference clock information is contained in the slot is stored in the undefined area of the slot header. With such a flag, reception apparatus 20 may determine that the head TLV packet is a TLV packet with reference clock information.

In addition, the identifier (information) indicating that the TLV packet is a TLV packet with reference clock information may be stored in the TMCC control information. FIG. 16 is a diagram illustrating structure of the TMCC control information under a transfer scheme for advanced broadband satellite digital broadcast.

The information for specifying and referencing the TLV packet with reference clock information may be stored in extension information within the TMCC control information illustrated in FIG. 16, and may be stored in another place within the TMCC control information. For example, stream classification/relative stream information in the TMCC control information may be used as information for specifying and referencing the TLV packet with reference clock information. FIG. 17 is a diagram illustrating the stream classification/relative stream information in the TMCC control information.

In FIG. 17, in the stream classification/relative stream information, the stream classification of each of 16 streams is indicated in 8 bits. That is, 1-frame transfer slot can transfer up to 16 (16-classification) streams. For example, the stream classification of an MPEG2-TS stream is "00000000", and the stream classification of a TLV stream is "00000010". However, under the current circumstances, the classifications of other streams are unassigned or undefined.

Therefore, when the stream classification of the TLV stream with reference clock is defined, for example, as "00000100" and the relative stream is a TLV stream with a reference clock, "00000100" is stored in the stream classification/relative stream information in the TMCC control information. Here, in the stream with the stream classification of "00000100", the TLV packet containing reference clock information is stored, for example, once per 5-slot unit which is a slot assignment unit, or once per frame unit.

Reception apparatus 20 analyzes the stream classification/relative stream information in the TMCC control information. When the stream classification is "00000100", reception apparatus 20 acquires the TLV packet with reference clock information from the slot determined in advance.

Note that a case may be considered where the stream classification including download type TLV packets and the stream classification including stream type TLV packets, such as video and audio, are defined. In such a case, reception apparatus 20 may determine that the reference clock information is contained in the stream when the stream classification of the received stream is a stream type TLV packet. This is because the reference clock information is not used in reproduction of download type TLV packets.

In addition, when the information for specifying and referencing the TLV packet with reference clock information is stored in the extension information of the TMCC control information, for example, information for each of the 16 relative streams is stored in the extension area of the TMCC control information.

Figure 18:
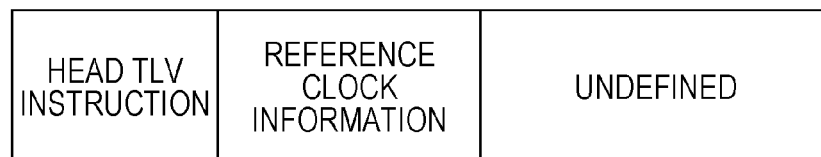
FIG. 18 is a diagram illustrating an example in which the reference clock information is stored in an undefined field of the slot header.

Also, as illustrated in FIG. 18, an area into which the reference clock information is stored may be newly defined in the undefined field of the slot header. FIG. 18 is a diagram illustrating an example in which the reference clock information is stored in the undefined field of the slot header.

Also, the reference clock information may be stored in a previously determined slot, and information indicating that the reference clock information is contained may be stored within the slot header. Here, the previously determined slot is, for example, a head slot of the transfer slot (Slot #1 in the example of FIG. 13), and the reference clock information stored in the IP packet may be contained in the head TLV packet within this slot.

Also, when the plurality of streams are contained in the transfer slot, the previously determined slot may be, for example, a head slot of each stream contained in the transfer slot, and the reference clock information stored in the IP packet may be contained in the head TLV packet within this slot.

Also, the TMCC control information may store information for specifying and referencing the slot header containing the reference clock information. Note that the storage method of the information for specifying and referencing the slot header containing reference clock information in the TMCC control information is similar to the aforementioned storage method of the information for specifying and referencing the TLV packet with reference clock information, and thus description thereof will be omitted.

Reception apparatus 20 analyzes the TMCC control information, and when determination is made that the reference clock information is in the slot header, reception apparatus 20 extracts the reference clock information from the slot header.

Figure 19:
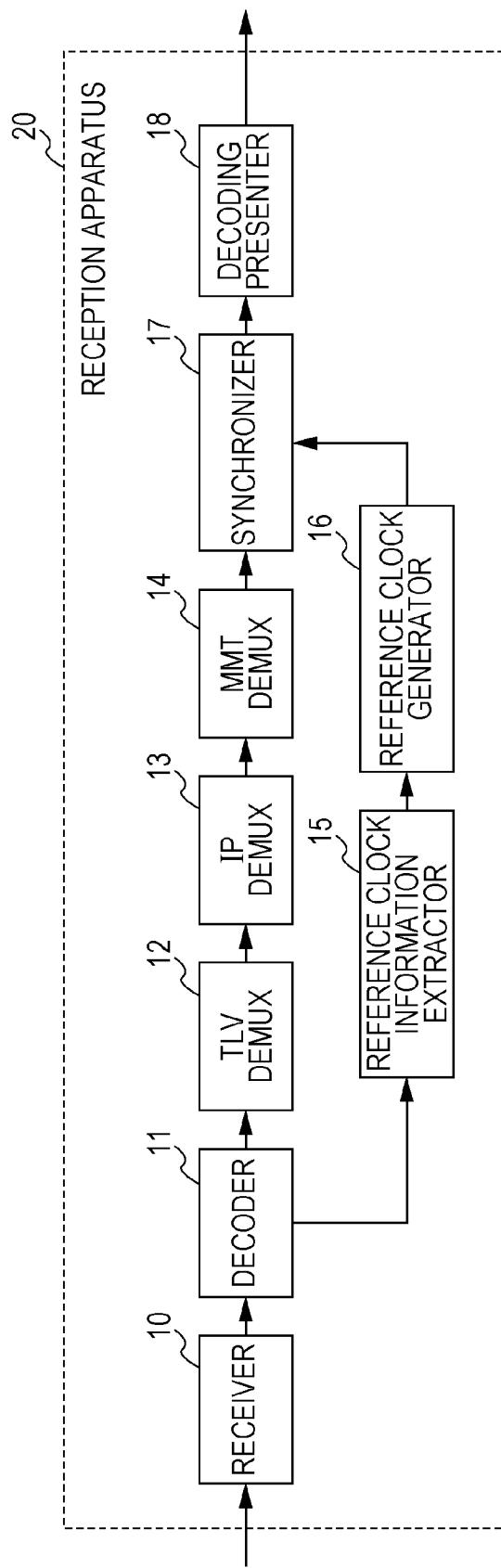
FIG. 19 is a block diagram illustrating the functional configuration of the reception apparatus when information indicating that the reference clock information is contained within the slot header is stored in TMCC control information.
Figure 20:
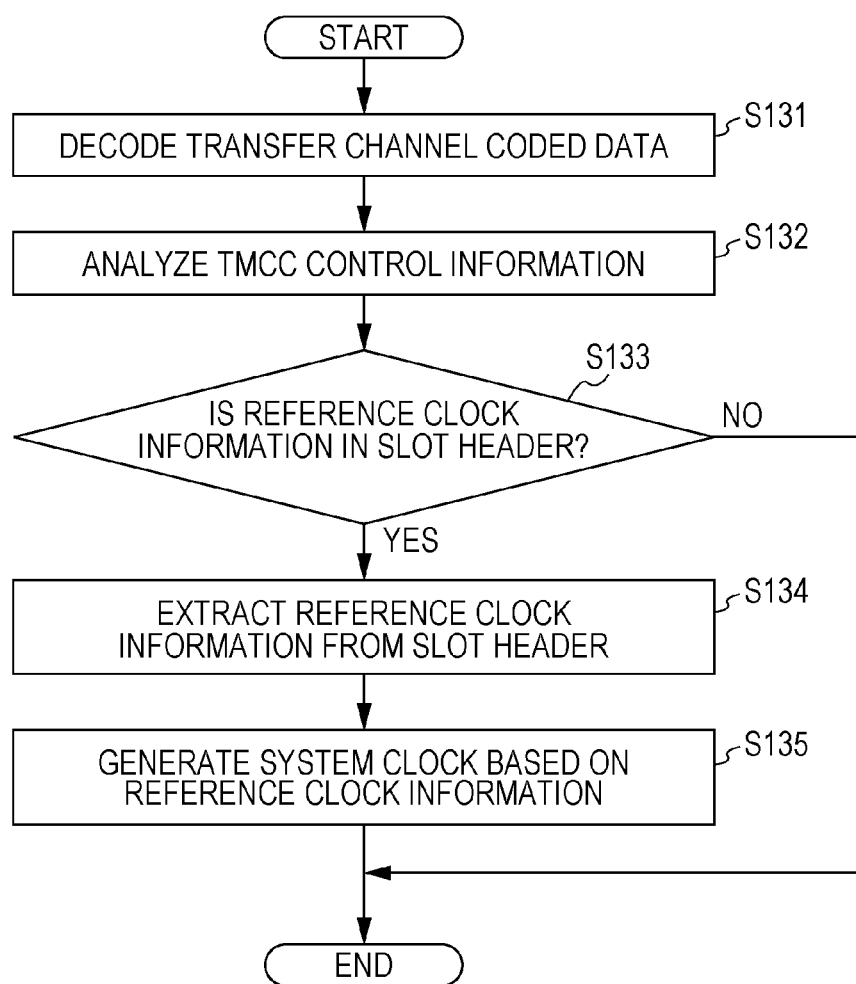
FIG. 20 is a diagram illustrating the acquisition flow of the reference clock information when the information indicating that the reference clock information is contained in the slot header is stored in the TMCC control information.

Also, the TMCC control information may store information indicating that the reference clock information is contained. FIG. 19 is a block diagram illustrating a functional configuration of reception apparatus 20 when the information indicating that the reference clock information is contained within the slot header is stored in the TMCC control information. FIG. 20 is an acquisition flow of the reference clock information when the information indicating that the reference clock information is contained in the slot header is stored in the TMCC control information.

In FIG. 19, when the information indicating that the reference clock information is contained within the slot header is stored in the TMCC control information, in reception apparatus 20, reference clock information extractor 15 acquires the reference clock information from the transfer slot that is output from decoder 11.

In the flow of FIG. 20, decoder 11 decodes the transfer channel coded data (S131), analyzes the TMCC control information (S132), and determines whether the reference clock information is in the slot header within the transfer slot (S133). When the reference clock information is in the slot header (Yes in S133), reference clock information extractor 15 extracts the reference clock information from the slot header (S134), and reference clock generator 16 generates the reference clock of the system (system clock) based on the reference clock information (S135). On the other hand, when the reference clock information is not in the slot header (No in S133), the acquisition flow of the reference clock information ends.

Reception apparatus 20, which can acquire the reference clock information in the layer of the transfer slot, can acquire the reference clock information more quickly than a case where the reference clock information is stored in the TLV packet.

As described above, by storing the reference clock information in the TLV packet or transfer slot, reception apparatus 20 can reduce the processes until the acquisition of the reference clock information, and may shorten acquisition time of the reference clock information.

In addition, by storing the reference clock information in a physical layer, reception apparatus 20 can easily implement acquisition and reproduction of the reference clock information by hardware, and clock reproduction with higher-precision is possible than acquisition and reproduction of the reference clock information by software.

In addition, in the aforementioned transmission method according to the first exemplary embodiment, in the system in which the plurality of layers (protocols) exists including the IP layer, the transmission apparatus adds the time stamp of a medium based on the reference clock information in the layers upper than the IP layer, and transmits the reference clock information in the layers lower than the IP layer. This allows reception apparatus 20 to easily process the reference clock information by hardware.

Note that, based on a similar idea, storing the reference clock information in a condition of not being stored in the MMT packet within the IP packet can also be considered. Even in such a case, reception apparatus 20 can reduce the processes for acquiring the reference clock information as compared with the case where the reference clock information is stored in the MMT packet.

[Transmission Cycle of the Reference Clock Information]

A transmission cycle of the reference clock information will be supplemented below.

In the case of storing the reference clock information in the TLV packet, for example, the transmission apparatus stores time when the head bit of the TLV packet is transmitted as the reference clock information. In addition, not the transmission time of the head bit but predetermined time determined differently may be stored as the reference clock information.

The TLV packet containing the reference clock information is transmitted at predetermined intervals. In other words, the TLV packet containing the reference clock information is contained in the transfer slot and is transmitted in a predetermined transmission cycle. For example, at least one or more pieces of the reference clock information may be stored in the TLV packets and be transferred at intervals of 100 ms.

In addition, the transmission apparatus may dispose the TLV packets that contain the reference clock information at predetermined intervals at predetermined positions of the transfer slot under the advanced BS transfer scheme. In addition, the transmission apparatus may store the TLV packet containing the reference clock information once every 5-slot unit which is a slot assignment unit of the TLV packet, and may store the reference clock information in the head TLV packet of the first slot of the 5-slot unit. That is, the transmission apparatus may dispose the TLV packet that contains the reference clock information at a head within the head slot within the transfer slot (that is, immediately after the slot header).

In addition, the transmission apparatus may dispose the TLV packets that contain the reference clock information at predetermined intervals at predetermined positions of the transfer slot under the transfer scheme for advanced broadband satellite digital broadcast. For example, the transmission apparatus may store the reference clock information once every 5-slot unit which is a slot assignment unit in the head TLV packet of the first slot. That is, the TLV packet positioned at a head within the head slot of each stream contained in the transfer slot may contain the reference clock information. Also, the reference clock information may be stored in the first slot within the relative stream.

In addition, the transmission cycle and transmission interval of the reference clock information may be changed according to a modulation scheme or coding rate of the transfer channel coding scheme.

[Method for acquiring the reference clock information in the upper layer quickly] Next, a method will be described for shortening time to the acquisition of the reference clock information by reception apparatus 20 performing batch DEMUX processing from the lower layer to the upper layer.

Here, a method will be described by which the transmission apparatus stores the reference clock information in the upper layer such as the MMT packet, and stores in the IP packet the MMT packet in which the reference clock information is stored. In the method described below, by defining a protocol for storing in the TLV packet the IP packet in which the reference clock information is stored, the reception apparatus makes a direct reference to the MMT packet, which is the upper layer, from the lower layer such as the TLV packet, and acquires the reference clock information contained in the MMT packet without performance of normal DEMUX processing.

The transmission apparatus contains the reference clock information in the aforementioned control information stored in the MMT packet. The previously determined packet ID is added to the control information containing the reference clock information. Then, the transmission apparatus stores the MMT packet containing the reference clock information in a dedicated IP data flow, and adds the previously determined source IP address, destination IP address, source port number, destination port number, and protocol classification.

On receipt of the transfer channel coded data generated in this way, reception apparatus 20 may extract the IP packet containing the reference clock information by TLV demultiplexer 12 acquiring the previously determined IP data flow.

Note that, when the IP packet undergoes header compression processing, the reception apparatus adds, for example, an identifier indicating that the IP packet contains the reference clock information to a context identifier indicating identical IP data flow. The context identifier is stored in a compressed IP packet header. In this case, reception apparatus 20 can extract the IP packet containing the reference clock information with reference to the context identifier in the compressed IP packet header.

In addition, the IP packet containing the reference clock information may be prescribed not to undergo the header compression, and may be prescribed to always undergo the header compression. It may be prescribed that the previously determined context identifier is added to the IP packet containing the reference clock information, and that all the headers are compressed.

In addition, a method may also be considered for defining, in a TLV data type field, an identifier indicating that the TLV packet is an IP packet that belongs to the IP data flow containing the reference clock information, or an identifier indicating that the TLV packet is a compressed IP packet that belongs to the IP data flow containing the reference clock information. Also, such an identifier may be defined in a field other than the TLV data type field.

When a direct reference to the reference clock information is made from the lower layer, the reference clock information is stored at a previously determined position, and packets in which the reference clock information is stored (such as the MMT packet, IP packet, and TLV packet) are packets dedicated to the reference clock information. In addition, a length of the field before the reference clock information becomes fixed by a packet header length being fixed.

However, the length of the field before the reference clock information does not need to be fixed. The reception apparatus only needs to specify the length of the field before the reference clock information in the lower layer. For example, when information on the length to the reference clock information includes two types, A and B, reception apparatus 20 can specify the position of the reference clock information by signaling which of A and B the length information is in the lower layer. Alternatively, by the transmission apparatus storing in the lower layer positional information on the reference clock information that allows a direct reference to the reference clock information in the upper layer, reception apparatus 20 may make a reference from the lower layer based on the positional information.

The following describes a specific method for shortening acquisition time of the reference clock information in the upper layer.

Reception apparatus 20 determines the TLV data type. On determination that the reference clock information is contained, reception apparatus 20 acquires the reference clock information contained within the MMT packet directly from the IP packet.

Reception apparatus 20 may extract the reference clock information contained in the MMT packet by extracting a bit string at a specific position from the IP packet or compressed IP packet, with analysis of the IP address, port number, or context identifier omitted. "Extracting a bit string at a specific position" means, for example, extracting information of a specific length from a position that is offset by fixed-length bytes from the TLV packet header. The reference clock information is acquired by "extracting a bit string at a specific position".

The offset length of the fixed-length bytes for extracting the reference clock information is uniquely determined for each of the IP packet and the compressed IP packet. Therefore, reception apparatus 20 can acquire the reference clock information by extracting the information of the specific length from the position that is offset by the fixed-length bytes immediately after determining the TLV data type. Note that the extraction of the information may be performed not from the position that is offset by the fixed length from the TLV packet header but from a position that is offset by the fixed length from a specific field of TLV.

Note that the aforementioned method is one example, and the reference clock information in the upper layer may be acquired from the lower layer through definition of another protocol or identifier. For example, an identifier indicating whether the IP packet contains the reference clock information may be stored in a field other than the TLV data type field.

In addition, for example, reception apparatus 20 may extract reference time information contained in the MMT packet by extracting the bit string at a specific position from the IP packet or compressed IP packet while omitting to analyze the IP address, the port number, and the context identifier.

When it is difficult to determine the IP data flow containing the reference clock information from identification information on the IP data flow, reception apparatus 20 may specify the MMT packet containing the reference clock information based on unique identification information (packet ID) added to the MMT packet containing the reference clock information. In this case, the reference clock information is extracted from the specific field as described above.

Also, when the reference clock information contained in the MMT packet is not stored at the position determined in advance or when the position where the reference clock information contained in the MMT packet is stored cannot be specified, reception apparatus 20 specifies the MMT packet containing the reference clock information by using the aforementioned method, specifies the position of the reference clock information based on MMT packet header information, and extracts the reference clock information.

Note that, although an example has been described above in which the MMT packet is stored in the IP packet, data to be stored in the IP packet does not need to be the MMT packet, but may be, for example, data that has another data structure. That is, the reference clock information may be contained in the IP packet in data structure different from data structure of the MMT packet. Even for data with different data structure, in a similar manner to the aforementioned example, data containing the reference clock information is stored in a dedicated IP data flow, and identification information indicating that the data contains the reference clock information and identification information indicating that the data is an IP data flow containing the reference clock information are added.

Reception apparatus 20 identifies that the data is data containing the reference clock information, or that the data is an IP data flow containing data containing the reference clock information. When the reference clock information is contained, reception apparatus 20 extracts the reference clock information. Also, when the reference clock information is stored at a specific position of data, reception apparatus can extract the reference clock information contained in the data with reference to the specific position from packet structure of the lower layer.

In the aforementioned example, in order to extract the reference clock information from the IP packet or the compressed IP packet, based on whether the data is the IP packet or the compressed IP packet, reception apparatus 20 extracts the reference clock information from respective fixed-length offset positions different from each other. However, if it is predetermined that header compression processing is omitted on the IP packet containing the reference clock information, or if it is predetermined that all the IP packets containing the reference clock information undergo header compression, reception apparatus 20 may omit the determination whether the data is the IP packet or the compressed IP packet. Also, reception apparatus 20 may perform determination whether the reference clock information is contained, after the header of the compressed IP packet is decompressed.

A reception method for extracting the bit string at a specific position from the IP packet or compressed IP packet will be described below with reference to the flowchart. FIG. 21 is a flowchart for extracting the bit string at a specific position from the IP packet or compressed IP packet. Note that the configuration of reception apparatus 20 is similar to the block diagram illustrated in FIG. 8.

In the flow of FIG. 21, first, decoder 11 decodes the transfer channel coded data received by receiver 10 (S141), and extracts the TLV packet from the transfer channel slot (S142).

Next, TLV demultiplexer 12 analyzes the data type of TLV packet (S143), and determines whether the data type is an IP containing reference clock information (S144). When the determination is made that the data type is not an IP packet containing reference clock information (No in S144), the flow ends. When the determination is made that the data type is an IP packet containing reference clock information (Yes in S144), TLV demultiplexer 12 determines whether the IP header is compressed (S145).

When the IP header is not compressed (No in S145), reference clock information extractor 15 acquires the reference clock information contained within the MMT packet at a position that is offset by fixed-length N bytes from the TLV header (S146). When the IP header is compressed (Yes in S145), reference clock information extractor 15 acquires the reference clock information contained within the MMT packet at a position that is offset by fixed-length M bytes from the TLV header (S147).

For example, when the determination is made in step S145 that the IP header undergoes compression processing, in step S146, reference clock information extractor 15 acquires the reference clock information contained in the MMT packet from the position that is offset by N bytes from the TLV header. On the other hand, when the determination is made in step S145 that the IP header does not undergo compression processing, in step S147, reference clock information extractor 15 acquires the reference clock information contained in the MMT packet from the position that is offset by M bytes from the TLV header.

Finally, reference clock generator 16 generates the system clock based on the reference clock information (S148).

Note that, since data structure of the IP packet header differs according to whether the IP packet is IPv4 or IPv6, the fixed-length N bytes and M bytes have different values.

While the normal MMT packet containing audio, video, control signal, and the like undergoes DEMUX processing in normal steps, the MMT packet containing the reference clock information undergoes batch DEMUX processing from the lower layer to the upper layer. This allows the reception apparatus to acquire the reference clock information in the lower layer even when the reference clock information is stored in the upper layer. That is, the reception apparatus can reduce the processes for acquisition of the reference clock information, shorten time to the acquisition of the reference clock information, and facilitate hardware implementation.

Second Exemplary Embodiment

Currently, as a method for using an extension area in TMCC control information (hereinafter also simply referred to as TMCC) under an advanced BS transfer scheme, ARIB (Association of Radio Industries and Businesses) is studying a method for transmitting urgent information and the like as a payload.

However, a proposed conventional method for using the extension area in the TMCC control information is limited to a method for transmitting a data payload, such as text and images, by using the TMCC control information extending over several frames. Therefore, the method for using the extension area in the TMCC control information will be limited, which needs to be addressed.

For example, it is difficult to store control information (control signal) that does not change in value for each frame, such as a conventional transfer mode and slot information, or control information that changes in value for each frame such as reference clock information, in the extension area of the TMCC control information simultaneously with payload data extending over several frames.

Therefore, the second exemplary embodiment describes a method for making it possible to store data with different reception processing simultaneously in the extension area of the TMCC control information, by dividing the extension area of the TMCC control information in accordance with a classification of information and data to be stored in the extension area of the TMCC control information. The present disclosure can enhance flexibility of extension by providing extensibility to the use of the extension area. Also, the reception apparatus can perform reception and analysis of the TMCC control information by reception methods different for each classification based on the classification of data.

In addition, the method according to the present disclosure allows payload data extending over several frames and payload data of one frame to be included together in the extension area. Since the reception apparatus can acquire the payload data of one frame first even while the payload data extending over several frames cannot be received, urgent information can be acquired and presented more quickly.

[Structure of TMCC Extension Information]

Structure of TMCC extension information will be described below. Note that basic structure of the TMCC control information is structure illustrated in FIG. 16. The control information to be stored in the TMCC control information is classified roughly into a first type and a second type below.

The first type of control information relates to frames, and does not change in value for each frame. A minimum update interval of the control information that does not change in value for each frame is a frame unit. Here, when the value of the control information is changed, control information after the change is transmitted two frames ahead. Also, when the value of the control information is changed, notification is made by increment of an 8-bit change instruction. Specifically, information other than pointer information and slot information corresponds to the control information that does not change in value for each frame.

The second type of control information relates to frames, and changes in value for each frame. Since the control information that changes in value for each frame is information that changes in value for each frame, the change instruction is not made. Specifically, the control information that changes in value for each frame is the pointer information and the slot information.

FIG. 22A is a diagram illustrating structure of the TMCC extension information. In FIG. 22A, the TMCC extension information includes 16-bit extension identification and 3598-bit extension area. Setting a value other than all 0 in the extension identification validates the extension area.

FIG. 22B is a diagram illustrating an example of a conventionally proposed bit assignment method when the extension area is used as a payload. In FIG. 22 (b), when the extension area is used as a payload, a number of pages includes 16 bits, and indicates over how many frames of the TMCC control information during transfer an additional information payload is transferred.

A page number includes 16 bits, and indicates in which page the TMCC control information during transfer is among the number of pages. An additional information classification includes 8 bits, and specifies the classification of the additional information. Specifically, the additional information classification is, for example, superimposed characters (subtitles), graphics, audio, and the like.

All of the extension area will be used as a payload, and it is difficult to store control information such as the conventional TMCC control information.

[Extension Method of the TMCC Extension Area]

Here, a method will be described for storing data with different reception processing in the TMCC extension area, by dividing the TMCC extension area in accordance with the classification of information and data to be stored in the TMCC extension area.

The classification of information and data to be stored in the TMCC extension area (hereinafter referred to as an extension classification) is classified as follows, for example.

Type A:
  Type A indicates control information that relates to frames and does not change in value for each frame.
  Minimum update interval is a frame unit. When there is a change in the value, information after the change is transmitted two frames ahead.
  When there is a change in the value, notification of the change is made by increment of the 8-bit change instruction.

Type B:
Type B indicates control information that relates to frames and changes in value for each frame.
Type B indicates information that changes in value for each frame, and the change instruction is not made.
Type C:
Type C indicates information or data that is used as a payload (conventional extension scheme).
However, for the change instruction, a change instruction field which is identical to TMCC which is not the extension area may be used, and the change instruction field may be independently prescribed in the extension area.

Figure 23:
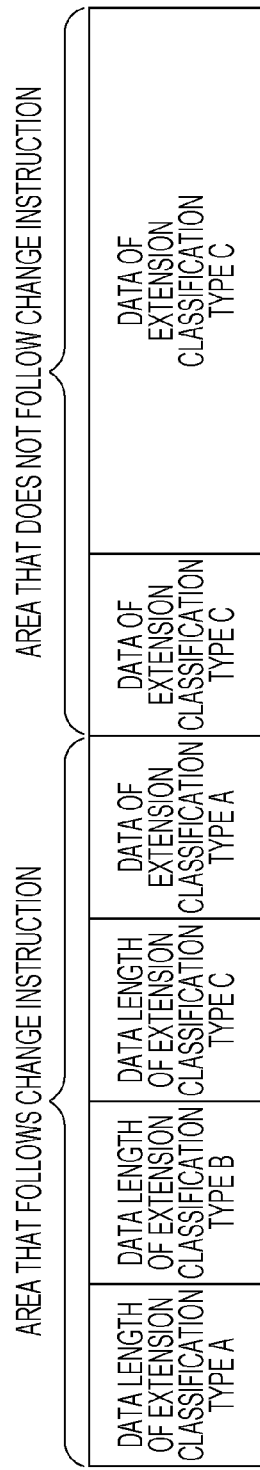
FIG. 23 is a diagram illustrating an example of data structure of an extension area in which an extension classification classified in this way is used.

FIG. 23 is a diagram illustrating an example of data structure (bit arrangement) of the extension area where the classified extension classification is used. FIG. 24A is a diagram illustrating an example of syntax when the extension classification is used. FIG. 24B is a diagram illustrating another example of syntax when the extension classification is used.

In FIG. 23, the aforementioned three types are defined as the extension classification. In addition, in FIG. 24A, subsequently to storage of a data length in each of the three types of extension classification, extension data with a length indicated in the data length is stored for each extension classification. The reception apparatus extracts data with the length indicated in the data length from the extension area for each extension classification, and performs processing.

For example, regarding data of Type A, the reception apparatus acquires the data when there is a change instruction. When there is a change in the data of Type A, the reception apparatus considers that the control information is changed, and performs processing on the control information in accordance with the change.

Also, regarding data of Type B, since the data of Type B changes in value for each frame, the reception apparatus acquires the data for every frame. For example, when the reference clock information that changes in value for each frame is stored in the TMCC control information, the reference clock information is stored in a data area of Type B.

Data of Type C contains payload information of the conventional extension scheme. Regarding the data of Type C, the reception apparatus performs operation in accordance with acquisition under the conventional extension scheme.

In the aforementioned example, details of data structure for each extension classification are separately prescribed. When prescribed separately, an identifier similar to the additional information classification and an object service specification method in the data of Type C in FIG. 22 (b) may be prescribed in other types. Note that the additional information classification may be defined using a common table, and the extension identification and the additional information classification may be merged.

In addition, information that may change in data length on the way may be considered as a classification similar to the data of Type A. When there is a change in the data length, a change instruction may be made through transmission of information after the change two frames ahead. When there is a change instruction, the reception apparatus confirms whether there is any change in the data length with reference to the data length of the extension classification.

Note that the data structure is not limited to the structure as illustrated in FIG. 23. For example, when the data length of the extension classification is fixed in advance, transmission of the data length may be omitted. Specifically, when the data length with the extension classification of Type A is fixed-length in FIG. 23, disposition of the data length with the extension classification of Type A may be omitted within the data structure. In addition, when the data length with the extension classification of Type A and the data length with the extension classification of Type B are fixed-length, disposition of the data length of all types may be omitted. In addition, a flag that indicates whether there is any data of the extension classification may be provided within the data structure.

In addition, syntax for using the extension classification is not limited to syntax illustrated in FIG. 24A. For example, in FIG. 24B, an extension area number is set, and the extension classification and extension area length are stored for each extension area number in the syntax. Subsequently, the extension data of the extension area number is stored in the syntax.

The syntax in FIG. 24A and FIG. 24B may support addition of the extension classification in the future. In addition, since the syntax in FIG. 24 and FIG. 24B enables storage of a plurality of pieces of data with identical extension classification, it is not necessary to determine details of data structure for each identical extension classification in advance. In addition, even when used as a payload (as Type C), the syntax in FIG. 24 and FIG. 24B allows description of a plurality of pieces of data with different number of pages, such as video and audio, in an identical frame.

Note that, in the syntax of FIG. 24B, the extension area number, extension classification, and extension area length may be classifications similar to Type A. That is, these pieces of information may be prescribed to be information that follows the change instruction. Therefore, the reception apparatus can easily make a determination on presence of changes by continuous storage of data that follows the change instruction.

In addition, an undefined area may be provided in the extension classification in preparation for future extension. As an extension classification to be introduced in the future, for example, the following classifications are assumed.

This is a control signal to be updated for each several frames, and the change instruction is not made.

For an urgent signal, the change instruction is made in a similar manner to Type A. However, processing of value change is performed in the frame immediately after acquisition of the change instruction, instead of after acquisition of information that is two frames ahead.

Also, for the aforementioned urgent signal, an urgent flag may be transmitted using the extension classification accompanied by the change instruction, and urgent data may be transmitted using a payload. Also, the extension classification may be classified in accordance with whether to follow the change instruction.

[Detailed Structure and Operation Flow]

Figure 25:
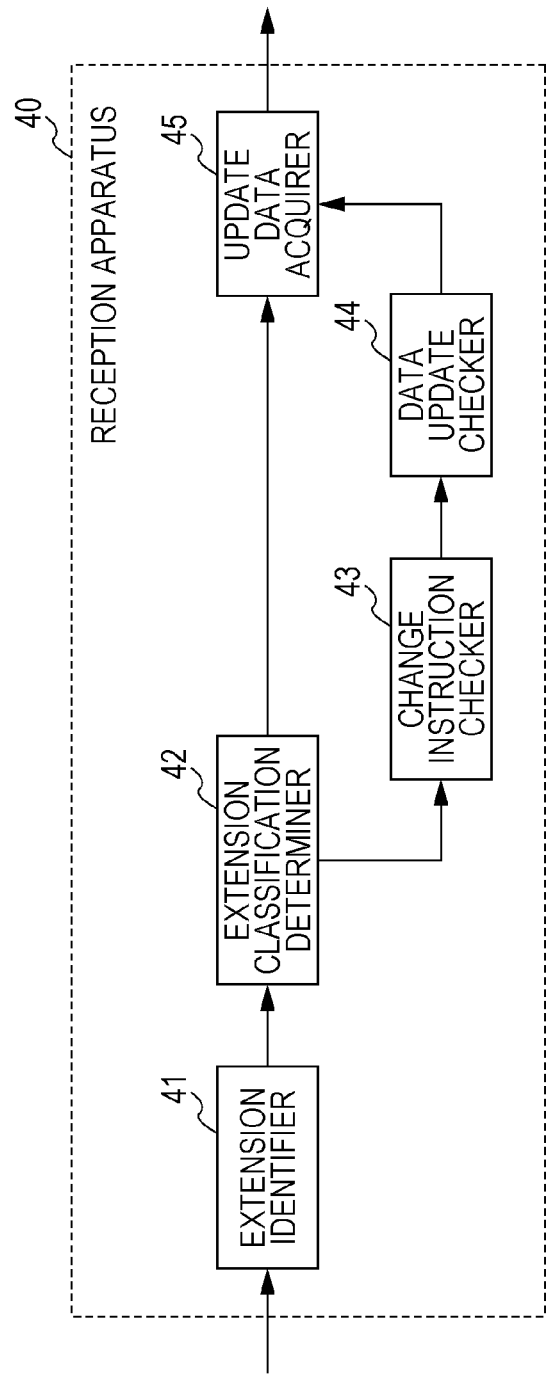
FIG. 25 is a block diagram illustrating a functional configuration of a reception apparatus according to a second exemplary embodiment.
Figure 26:
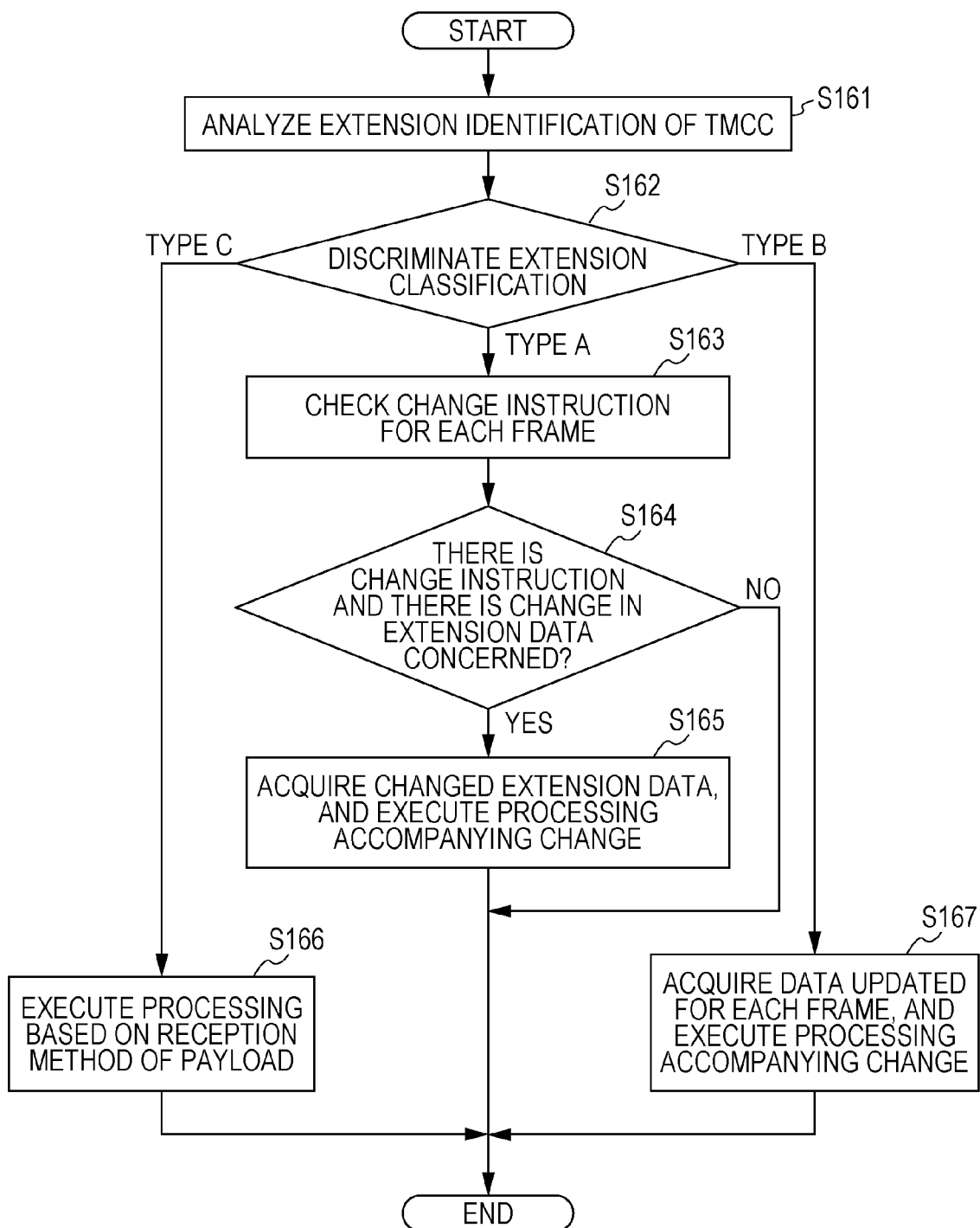
FIG. 26 is a diagram illustrating an operation flow of the reception apparatus according to the second exemplary embodiment.

A functional configuration and operation flow of the reception apparatus as described above will be described. FIG. 25 is a block diagram illustrating the functional configuration of the reception apparatus according to the second exemplary embodiment. FIG. 26 is a diagram illustrating the operation flow of the reception apparatus according to the second exemplary embodiment. Note that, in the following description, the extension classification includes three types, Type A, Type B, and Type C, as described above.

As illustrated in FIG. 25, reception apparatus 40 includes extension identifier 41, extension classification determiner 42, change instruction checker 43, data update checker 44, and update data acquirer 45.

First, extension identifier 41 analyzes the extension identification of the TMCC control information (S161). When the extension identification is other than all 0 here, extension identifier 41 considers that the extension area is effective, and reception apparatus 40 executes the following processing for each extension area.

Next, extension classification determiner 42 discriminates (determines) the extension classification (S162). When it is discriminated that the extension classification is Type A (Type A in S162), data of an area specified by an extension area length is control information which does not change in value for each frame, the control information following a change instruction. Therefore, change instruction checker 43 checks the change instruction for each frame (S163).

Subsequently, data update checker 44 determines data update (S164). When it is determined that there is a change instruction and that there is a change in the extension data (Yes in S164), update data acquirer 45 acquires updated extension data and executes processing accompanying the change (S165).

On the other hand, when it is not determined as described above in step S164 (No in S164), update data acquirer 45 determines that there is no change in the extension data.

Also, when it is discriminated in step S162 that the extension classification is Type B (Type B in S162), update data acquirer 45 references data specified by the extension area length, acquires data updated for each frame, and executes processing accompanying the change (S167).

When it is discriminated in step S162 that the extension classification is Type C (Type C in S162), update data acquirer 45 executes processing based on the conventional reception method under the payload extension scheme (S166).

Note that, when it is discriminated that the extension area number, extension classification, and extension area length are classifications similar to Type A that follows the change instruction as described above, update data acquirer 45 checks change instructions. When there is a change instruction, update data acquirer 45 checks whether information is updated.

Note that reception apparatus 40 may determine reception processing based on the extension classification, and may determine in which processing block the data processing should be performed. Reception apparatus 40 may determine, for example, to process the data of Type A and the data of Type B by hardware, and to process the data of Type C by software.

[Advantageous Effects, Etc.]

As described above, the second exemplary embodiment has described the method for dividing the TMCC extension area under the advanced BS transfer scheme for each extension classification, and for storing the extension data in the TMCC extension area. Reception apparatus 40 determines the extension data processing method based on the extension classification.

This makes it possible to store a plurality of pieces of data with different reception processing in the TMCC extension area simultaneously. That is, the present disclosure makes it possible to provide extensibility to the method for using the TMCC extension area.

Specifically, for example, the present disclosure makes it possible to store the payload and the reference clock information in the TMCC extension area simultaneously.

Also, it is possible to cause the payload data extending over several frames and the payload data of one frame to be included together in the TMCC extension area. Therefore, even when it is difficult to receive the payload data extending over several frames, reception apparatus 40 can first acquire the payload data of one frame. Therefore, reception apparatus 40 can acquire and present urgent information more quickly.

Other Exemplary Embodiments

Although the exemplary embodiments have been described above, the present disclosure is not limited to the aforementioned exemplary embodiments.

Although the storage method of the reference clock information has been described in the aforementioned exemplary embodiments, a plurality of pieces of reference clock information may be transmitted in one or more layers. When the plurality of pieces of reference clock information is transmitted, reception apparatus 20 may select one piece of the reference clock information and use the selected reference clock information for generation of the reference clock (system clock), and may use both pieces of the reference clock information to generate the reference clock. Reception apparatus 20 may select high-precision reference clock information, and may select reference clock information that may be acquired more quickly.

Also, when the reference clock information is transmitted in a plurality of layers, the transmission apparatus may store information indicating that the reference clock information is transmitted in the plurality of layers. In addition, the information indicating that the reference clock information is transmitted in the plurality of layers, or information related to the layers or protocols in which the reference clock information is transmitted may be transmitted in the lower layer.

This allows reception apparatus 20 to determine that the reference clock information is contained in the upper layer during DEMUX processing in the lower layer, and to determine which reference clock information to use based on this determination. Reception apparatus 20 may determine which reference clock information to use based on which layer of reference clock reproduction is supported, and reception apparatus 20 may use reference clock reproduction recommended by broadcasting station apparatuses.

When the reference clock information is transmitted in the plurality of layers, reception apparatus 20 may extract the reference clock information in the lower layer, and may further extract the reference clock information contained in the layers from the lower layer to the upper layer. Then, reception apparatus 20 may use at least one or more pieces of the extracted reference clock information to generate the reference clock.

In addition, the plurality of pieces of reference clock information may be transmitted through a plurality of transfer channels. In this case, information indicating that the plurality of pieces of reference clock information is transmitted through the plurality of transfer channels, and information related to the transfer channels through which the reference clock information is transferred may be transmitted.

Also, for example, in addition to a conventional 32-bit short-format NTP contained in the MMT packet header, when higher-precision reference clock information is transmitted, the transmission apparatus further transmits information for allowing reception apparatus 20 to use the high-precision reference clock information to reproduce the 32-bit short-format NTP. Such information is, for example, time information indicating a relative relationship between clocks, and is transmitted by using CRI_descriptor( ), etc.

Note that, when reception apparatus 20 can reproduce the 32-bit short-format NTP, the conventional NTP field contained in the MMT packet header is unnecessary. Therefore, the transmission apparatus may store another piece of information in the NTP field, and may perform header compression processing by reducing the NTP field. When the header compression processing is performed, the transmission apparatus transmits information indicating that the NTP field is reduced. When the NTP field is reduced, reception apparatus 20 generates the reference clock by using another piece of reference clock information, and reproduces the 32-bit short-format NTP.

In addition, when the MMT packet is transferred using a broadband channel, a broadband reception apparatus may use not the reference clock information but the 32-bit short-format NTP for QoS control. Accordingly, a broadband transmission apparatus may omit to transmit the reference clock information through the broadband channel. In addition, when end-to-end delay of the broadband channel is within a certain value, the broadband reception apparatus may use the reference clock information for clock reproduction.

Note that although the aforementioned first exemplary embodiment has described the case where the MMT/IP/TLV scheme is used as an example, schemes other than the MMT scheme may be used as a multiplexing scheme. For example, the present disclosure may be applied to an MPEG2-TS scheme, RTP scheme, or MPEG-DASH scheme.

In addition, methods for header compression of IP packets include RoHC (Robust Header Compression) and HCfB (Header Compression for Broadcasting).

Schemes for storing IP packets in broadcast include a GSE (Generic Stream Encapsulation) scheme, IPoverTS scheme using ULE (Unidirectional Light-weight. Encapsulation), and the like, in addition to the TLV scheme.

The present disclosure may be applied to a case where any of such schemes is used. Application of the present disclosure allows reception apparatus 20 to achieve shortening of time to the acquisition of the reference clock information and reduction in the processes, and to achieve high precision of the clock by hardware implementation.

Note that, while the reference clock information in the aforementioned exemplary embodiments is NTP when the multiplexing scheme is MMT, for example, when the multiplexing scheme is an MPEG2-TS scheme, the reference clock information is PCR (Program Clock Reference). Also, as the reference clock information, even when the multiplexing scheme is MMT, PTP prescribed by IEEE (Institute of Electrical and Electronics Engineers) 1588 may be transferred in an NTP form, and only some bits of NTP may be transferred. That is, the reference clock information only needs to be information indicating time that is set by the transmission apparatus. Note that NTP does not necessarily mean an NTP value in an NTP server commonly used on the Internet.

Figure 27:
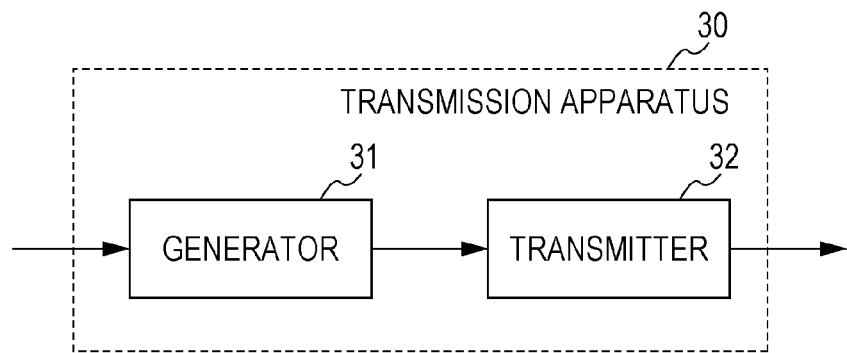
FIG. 27 is a block diagram illustrating a functional configuration of a transmission apparatus.
Figure 28:
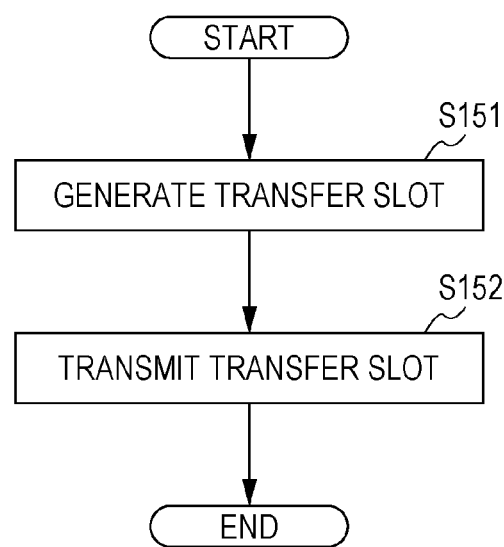
FIG. 28 is a diagram illustrating an operation flow of the transmission apparatus.

In addition, the present disclosure may be implemented as a transmission apparatus (transmission method) that transmits the transfer slot that stores the reference clock information by the above method. The following supplements a configuration of the transmission apparatus. FIG. 27 is a block diagram illustrating a functional configuration of the transmission apparatus. FIG. 28 is an operation flow of the transmission apparatus.

In FIG. 27, transmission apparatus 30 includes generator 31 and transmitter 32. Note that each component of transmission apparatus 30 is specifically implemented by a microcomputer, a processor, a dedicated circuit, or the like.

Transmission apparatus 30 is specifically a broadcasting server, and is an example of the aforementioned "transmission apparatus" of the first exemplary embodiment.

Generator 31 generates, for example, the transfer slot that stores the plurality of slots that each store one or more TLV packets that each store the IP packet (S151 of FIG. 28). For example, a plurality of relative streams that each include one or more slots is contained in the transfer slot.

Generator 31 contains the reference clock information, such as the NTP that indicates time for reproduction of content (for example, broadcast content such as video or audio), in the IP packet stored in the TLV packet positioned at a head within the head slot within the transfer slot (hereinafter this IP packet is also referred to as an object IP packet). That is, generator 31 contains the reference clock information in the IP packet stored in the TLV packet positioned at a head within the transfer slot. The object IP packet is an IP packet that does not undergo header compression processing, and the reference clock information is stored, for example, within the object IP packet in data structure different from data structure of the MMT packet.

Specifically, generator 31 includes a coder that codes the broadcast content, MMT multiplexer, IP multiplexer, TLV multiplexer, and the like. Here, the TLV packet is an example of a first transfer unit, the slot is an example of a second transfer unit, and the transfer slot is an example of a transfer frame. The relative stream is an example of the stream.

Transmitter 32 transmits the transfer slot generated by generator 31 (transfer channel coded data containing the transfer slot) through broadcast (S152 of FIG. 28).

As also described in the aforementioned first exemplary embodiment, transmission apparatus 30 can simplify the processes by which reception apparatus 20 acquires the reference clock information of each of the plurality of streams. Therefore, reception apparatus 20 can shorten time until reception apparatus 20 acquires the reference clock information.

Note that in the aforementioned exemplary embodiments, components may each include dedicated hardware or may be implemented through execution of a software program suitable for each component. The components may be each implemented by a program execution unit, such as a CPU and a processor, reading and executing the software program recorded in a recording medium such as a hard disk and a semiconductor memory.

In addition, the components may be circuits. These circuits may constitute one circuit as a whole, and may be different circuits. In addition, each of these circuits may be a general-purpose circuit, and may be a dedicated circuit.

For example, in each of the aforementioned exemplary embodiments, processes executed by a specific processor may be executed by another processor. In addition, order of the plurality of processes may be changed, and the plurality of processes may be executed in parallel.

The reception apparatus (reception method) and transmission apparatus (transmission method) according to one or more aspects have been described above based on the exemplary embodiments. However, the present disclosure is not limited to these exemplary embodiments. The present exemplary embodiments to which various modifications conceivable by a person skilled in the art are made, and aspects that are made by combining elements of different exemplary embodiments may also be within the scope of the one or more aspects as long as such aspects do not depart from the gist of the present disclosure.

The transmission method according to the present disclosure is useful as a transmission method capable of reducing the processes of the reception apparatus for acquiring the reference clock information when the MMT scheme is applied to a broadcasting system.

What is claimed is:

1. A transmission method, comprising:
generating frames, each frame including first control data, second control data, and a first transfer unit, the first transfer unit includes one or more second transfer units, the first control data including first information indicating a start position of the one or more second transfer units within the first transfer unit, the second control data including second information indicating whether the first control data includes reference clock information or not, the first control data including the reference clock information when the second information indicates the first control data includes the reference clock information; and
transmitting the frames, wherein
the reference clock information is cyclically transmitted,
(i) a first frame among the frames includes the first control data including the reference clock information and the second control data indicating that the first control information includes the reference clock information, and (ii) a second frame among the frames includes the first control data not including the reference clock information and the second control data indicating that the first control data does not include the reference clock information, and
the reference clock information is based on Precision Time Protocol (PTP) prescribed by Institute of Electrical and Electronics Engineers (IEEE) 1588.

2. The transmission method to claim 1, wherein
the first transfer unit has a fixed-length, and
each of the one or more second transfer units has a variable length.

3. The transmission method according to claim 1, wherein
the first transfer unit is a slot,
each of the one or more second transfer units is a Type Length Value (TLV) packet,
the first control data is transmitted in a slot header, and
the second control data is transmitted in a Transmission and Multiplexing Configuration Control (TMCC) signal.

4. The transmission method according to claim 1, wherein
the reference clock information includes a current clock value used at a receiver to reproduce a reference clock signal.

5. A transmission apparatus, comprising:
a frame configurator that, in operation, generates frames, each frame including first control data, second control data, and a first transfer unit, the first transfer unit includes one or more second transfer units, the first control data including first information indicating a start position of the one or more second transfer units within the first transfer unit, the second control data including second information indicating whether the first control data includes reference clock information or not, the first control data including the reference clock information when the second information indicates the first control data includes the reference clock information; and
a transmitter that, in operation, transmits the frames, wherein
the reference clock information is cyclically transmitted,
(i) a first frame among the frames includes the first control data including the reference clock information and the second control data indicating that the first control information includes the reference clock information, and (ii) a second frame among the frames includes the first control data not including the reference clock information and the second control data indicating that the first control data does not include the reference clock information, and
the reference clock information is based on Precision Time Protocol (PTP) prescribed by Institute of Electrical and Electronics Engineers (IEEE) 1588.

6. The transmission apparatus according to claim 5, wherein
the first transfer unit has a fixed-length, and
each of the one or more second transfer units has a variable length.

7. The transmission apparatus according to claim 5, wherein
the first transfer unit is a slot,
each of the second transfer units is a Type Length Value (TLV) packet,
the first control data is transmitted in a slot header, and
the second control data is transmitted in a Transmission and Multiplexing Configuration Control (TMCC) signal.

8. The transmission apparatus according to claim 5, wherein
the reference clock information includes a current clock value used at a receiver to reproduce a reference clock signal.

* * * * *